United States Patent
Hammelbacher

(10) Patent No.: US 9,349,031 B2
(45) Date of Patent: May 24, 2016

(54) METHOD, COMPUTER PROGRAM PRODUCT, AND CHANGING STATION FOR TRACKING A PROCESS

(76) Inventor: Stephan Hammelbacher, Holzkirchen (DE)

( * ) Notice: Subject to any disclaimer, the term of this patent is extended or adjusted under 35 U.S.C. 154(b) by 575 days.

(21) Appl. No.: 13/639,801

(22) PCT Filed: Apr. 6, 2011

(86) PCT No.: PCT/DE2011/000364
§ 371 (c)(1),
(2), (4) Date: Oct. 25, 2012

(87) PCT Pub. No.: WO2011/124209
PCT Pub. Date: Oct. 13, 2011

(65) Prior Publication Data
US 2014/0055248 A1  Feb. 27, 2014

(30) Foreign Application Priority Data
Apr. 6, 2010 (DE) .......................... 10 2010 014 048

(51) Int. Cl.
*H04Q 5/22* (2006.01)
*G06K 7/10* (2006.01)
(Continued)

(52) U.S. Cl.
CPC ............ *G06K 7/10366* (2013.01); *A01K 1/031* (2013.01); *G05B 19/0423* (2013.01); *H01Q 1/2216* (2013.01); *H01Q 21/28* (2013.01); *G05B 2219/36371* (2013.01)

(58) Field of Classification Search
CPC .......... G06K 7/10366; G06K 7/10009; G06K 19/0723; G06K 7/0008; G06K 7/10316
USPC ................................................ 340/10.1–10.6
See application file for complete search history.

(56) References Cited

U.S. PATENT DOCUMENTS 5,432,702 A   7/1995  Barnett
2005/0205658 A1   9/2005  Baker et al.
(Continued)

FOREIGN PATENT DOCUMENTS

WO    2005/083614 A2    9/2005

OTHER PUBLICATIONS

Trade Exhibition brochure "iat Congress"; Mar. 31, 2009-Apr. 2, 2009; pp. 64-66.
(Continued)

*Primary Examiner* — George Bugg
*Assistant Examiner* — Sharmin Akhter
(74) *Attorney, Agent, or Firm* — Studebaker & Brackett PC

(57) ABSTRACT

A method for tracking processes and/or services, which concern at least one object, in which a reading device detects data or attributes of a data carrier associated with the object or container thereof, wherein the data describe the object, comprising the following steps:
  a) identifying the object by detecting the data of the data carrier by means of the reading device and
  b) detecting a process or a service and/or the data obtained therefrom concerning the object,
is further developed in that, between steps a) and b), a selection of processes and/or services from a plurality is made depending on the detected data, and the selection is offered to an operating person to be carried out. The invention also relates to a computer program product for setting up a computer system with regard to programming, and a changing station for carrying out the method.

20 Claims, 18 Drawing Sheets

Figure 1:
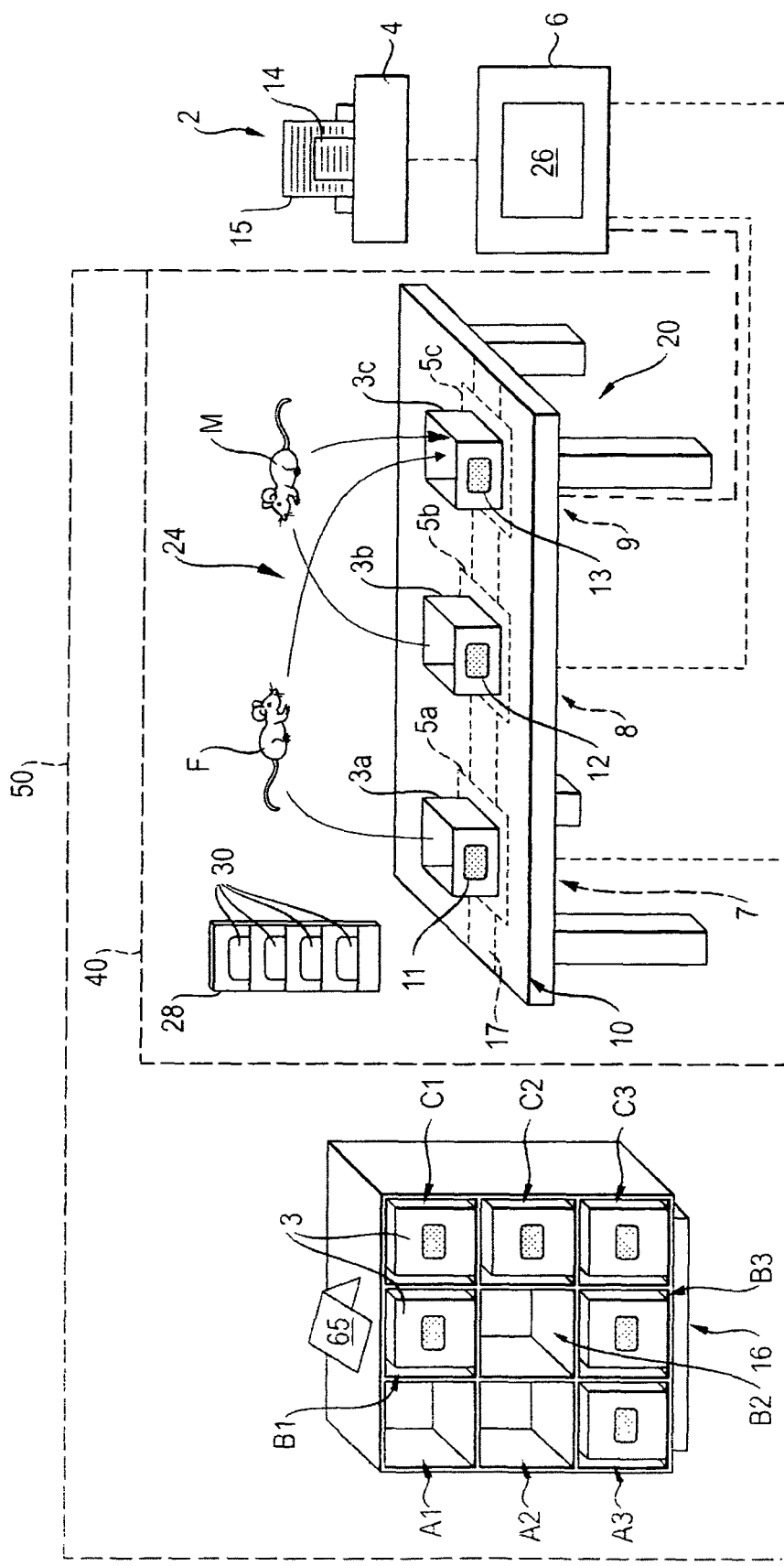

(51) Int. Cl.
*A01K 1/03* (2006.01)
*G05B 19/042* (2006.01)
*H01Q 1/22* (2006.01)
*H01Q 21/28* (2006.01)

(56) References Cited

U.S. PATENT DOCUMENTS

2005/0258967 A1* 11/2005 Poliska ............... A01K 11/006
                                                        340/573.3
2006/0065713 A1   3/2006  Kingery
2007/0192133 A1*  8/2007  Morgan ............... G06F 19/321
                                                        705/2
2010/0023429 A1   1/2010  Bolander et al.
2010/0064374 A1*  3/2010  Martin ................ G06F 19/3406
                                                        726/27
2010/0249987 A1*  9/2010  Hong et al. .................. 700/215
2010/0261948 A1* 10/2010  Chilton, III ............ A61G 11/00
                                                        600/22

OTHER PUBLICATIONS

LabAnimal Europe; vol. 8 No. 12; Dec. 2008.
European Search Report; PCT/DE2011/000364; Sep. 26, 2011.

* cited by examiner

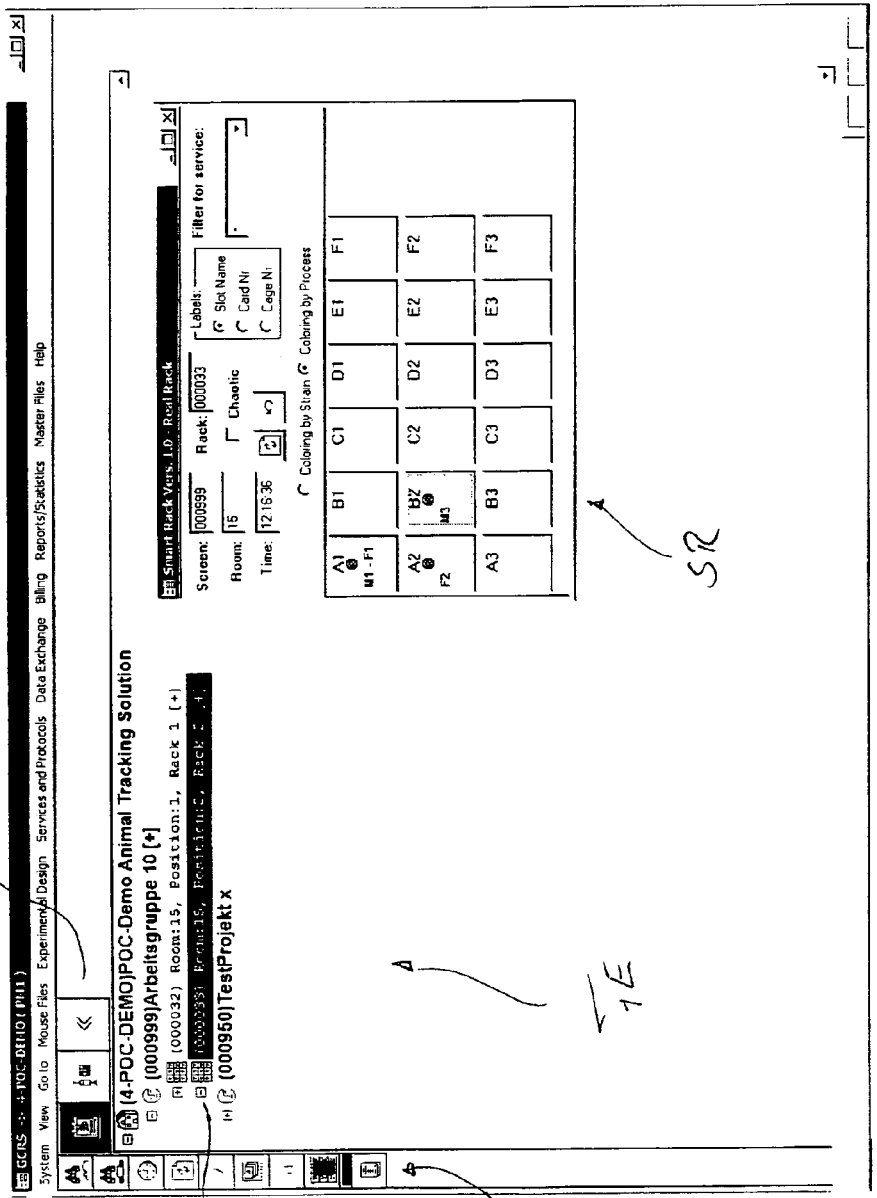

METHOD, COMPUTER PROGRAM PRODUCT, AND CHANGING STATION FOR TRACKING A PROCESS

The invention relates to a method for tracking processes and/or services, which concern at least one object, in which a reading device detects data or attributes of a data carrier associated with the object or the container thereof, wherein the data describe the object or properties thereof. The method comprises the following steps:

a) identifying the object by detecting the data of the data carrier by means of the reading device and b) detecting a process or a service and/or the data obtained or altered thereby concerning the object or properties thereof, said data possibly also being unaltered.

The invention further relates to a device and a computer system for carrying out the method and to a computer program product for setting up a computer system of this type with regard to programming. The invention also relates to a changing station for carrying out and tracking processes and/or services.

It is necessary to track processes and/or services, for example in hospitals with patients as objects, or in genetic research, where laboratory animals are used as objects. Objects may consequently be patients, laboratory animals, or also bacteria or viruses in a Petri dish or seedlings in plant breeding. Since, in particular in medical research, objects are very small and change constantly, interact with one another, for example pair with one another, procreate or, for example, grow cell strains, direct electronic marking, for example by means of a barcode or transponder, is often impossible or very costly. The objects may therefore be identified via their storage location, for example via the hospital bed of the patient, a cage of the laboratory animal, or the Petri dish in microbiological laboratories, which can be marked in a more easily readable manner, particularly electronically.

The processes may be transection and/or transformation processes. Transaction processes involve a change in location and for example may be the removal or addition of objects, for example of laboratory animals from or to a cage, the transfer of a cage, either with or without contents, from an original storage location or site to a new site, or the relocation of an object from a first container into a second container.

Transformation processes involve a change to the properties of at least one object. In the case of a laboratory animal, this may be an illness or the death of the laboratory animal or the documentation of a phenotype. It may also involve the formation of sub-objects from a single object, for example birth processes in the case of a laboratory animal for example, the detection of a litter, whereupon new objects may be formed, or samples of the objects, which themselves, in turn, constitute an object.

Services to be carried out may be an examination for example, which is performed on an object. They may be medical procedures with results, or else reports concerning this object. Services follow the principle of supply and demand.

The prior art and the invention will be described hereinafter predominantly on the basis of the example of animal breeding and gene research. However, the invention can be easily transferred to all objects situated at a defined and recorded location, that is to say including the other fields of application disclosed above.

In animal research, in particular in genetic research, a large number of laboratory animals are used. Laboratory animals are held openly in corresponding racks, in the compartments of which cages may be arranged, and are specifically held in a pathogen-free manner in, for example, individually vented cages (IVCs) or in isolators. For example, the laboratory animals are transferred or relocated into other cages in separate changing stations. To this end, the changing station comprises at least one transfer table having a work surface, on which the transfer can be carried out. Isolators are used if there are specific requirements concerning the sterility of laboratory animals. In an isolator, both the rack and also the transfer table of a changing station are located beneath a canvas, in which defined ambient conditions prevail. Material from outside is introduced via a lock. Laboratory animal and cage transactions are carried out on the work surface via glove ports.

The laboratory animals are fed and bred by qualified animal keepers. Each process and each service in the animal spaces has to be documented meticulously by the animal keeper. This was previously carried out predominantly manually.

In these times of increasing genetic research, clinical database systems are becoming increasingly widespread, both for laboratory animal management and for implementation of in vivo tests as well as for the management and analysis of in vitro samples. The databases are characterised by a high level of complexity and a high transaction volume. It is desirable to document the processes carried out in the animal spaces and the services provided in the animal spaces as closely as possible to the time at which they were carried out and provided and to input this information into clinical databases so as to provide access to this data. Due to the complexity of the user interface of databases, the animal keepers require comprehensive training until the data are detected reliably from a technical viewpoint. Although these are recurrent routine processes, due to the comprehensive inputs required, animal keepers are often too overstretched to detect the data reliably during their work in the animal spaces. They often have to record the data manually and transfer it into the database at a later moment in time.

Known methods include:

animal databases with manual recording and subsequent follow-up, use of barcodes on cage cards and hand-held reading devices, which are able to call up from a database, and display, information concerning the read barcode, use of hand-held reading devices, which are able to call up from a database and display information concerning a read-out transponder, mobile computer workstations in the animal rooms, equipped with a computer so as to record the complex transactions in a laboratory animal management system, and mobile computer workstations with UHF lasers, large antennas and computers for physically surveying cages and cage card holders.

The documentation methods conflict with the natural physical working methods of humans, however, who engage objects and at the same time control the process to be carried out by using their brain. In particular, complex physical processes, which are indeed carried out routinely, repetitively and uniformly, but always proceed slightly differently depending on the situation, are only assisted inadequately by the available prior art. These methods are disappointing, since the animal keepers cannot record the information ergonomically as they carry out their workload, but are forced to split their work concerning the actual process and services from their work concerning data detection and documentation, which is likely to result in errors. Computers, in particular a keyboard, mouse and a manual barcode reader, present additional contamination bridges in the animal rooms. The method described above is therefore generally not used in isolators, since computer technology can only be introduced into isolators in a very time-consuming manner and sterilisation within the isolator is not possible.

The object of the invention is therefore to provide a method, a computer system and a computer program product and a device for carrying out the method that simplify the tracking of processes carried out on an object and services provided to an object.

The object of the invention is solved with the method described in the introduction in that, between the identification of the object in step a) and the detection of a process or a service or the associated data in step b), in a first intermediate step ai) a selection or a partial quantity of processes and/or services from a plurality, specifically from total quantity of processes and/or services, is made according to the data detected in step a), and in a second intermediate step aii) merely the selection of processes and/or services is offered to an operator for implementation in step b).

The selection can be displayed, for example on an operating terminal of a computer system. By inputting information at the operating terminal, the operator can select merely the offered processes or services. The smaller selection of offered processes compared to the number of theoretically possible processes facilitates the operating effort required on the part of the operator, because the operation process is clearer due to the omission of irrelevant possibilities and requires fewer decisions to be made by the operator. The operator is thus able to carry out even complex transaction and/or transformation processes or comprehensive services with fewer inputs. In addition, accidental incorrect operations are thus reduced. The simple operation process and the lower error quota in turn increase the speed and acceptance of the computer system by the operator.

The invention thus abandons the process/object orientation known from the prior art, which associates objects to be treated with a preselected process and thus restricts an operator to the one preselected process, although other processes may be necessary depending on the situation. Rather, the invention adopts the principle of what is known as an "object-driven" method, in which the objects themselves or their properties define the offered selection of processes and services and therefore limit the subsequent work cycle: They limit a theoretically possible number of processes to an expedient number of processes and services, specifically the possible processes and services or the processes and services applicable specifically to the objects, and offer these to an operator. The invention also allows automated information acquisition, embedded in the work flow on a work surface with the automatic processing of data concerning processes and services. It leads to data that are current at any moment in time and to a target status of objects or containers. The invention can be used in the field of animal breeding, on open transfer tables, in laminar-flow changing stations, in isolators or other transfer stations, or in plant breeding, etc.

The method according to the invention is based on the natural working method of humans and first identifies one or more objects directly or via they storage locations and then identifies a constellation mandatory for one or more processes and/or services from the properties of the object or a plurality of objects having simultaneous access, and therefore offers the user a selection of processes and/or services possible by the constellation. In the case of the object-driven method according to the invention, a large part of the process of selecting processes and/or a service is consequently shifted into the method itself. The method thus saves the operator the trouble of having to make many inputs, which in turn leads to a simpler, quicker and more reliable execution of the method.

In accordance with the invention the method detects and documents processes, such as transaction or transformation processes, and services to be carried out and the data, concerning the objects, obtained from said methods and services. To simplify and assist the method, the method may be performed with the aid of a computer system, in particular with large amounts of data. The computer system may have a memory, in which data sets of the processes and services are stored. An operating terminal to be actuated manually can be used for communication with a computer system to be set up in terms of programming.

The data or attributes of the objects, such as age, sex, descent, and their position in a rack, etc. are stored in a database. If processes or services are carried out on the objects, the data concerning the objects are generally also changed. As the processes and services are detected, the data sets consequently have to be opened to as to be changed. Identification data are therefore advantageously stored and detected on the data carriers of the objects. The identification data correlate with data sets that are stored in the memory of the computer system or in a database stored there and that contain information concerning the respective objects and/or properties. The data carriers therefore only need to carry a small amount of identification data, which reduces the technical complexity thereof. As identification data, they contain merely one type of key so as to enable an assignment of the object to its correct data set. The technical complexity for, or of, the process of identifying objects is relatively low, because only the relatively few identification data have to be detected. Both conventional labels, which carry a preferably machine-readable code as a key, for example a barcode, and electronic carriers such as magnetic core memories or memory chips, for example RFID transponders, are suitable data carriers that transport identification data.

Due to the often slow response times of databases to remote servers, the data sets are currently created manually on a container card in the form of a data carrier, even with large amounts of data, and are only later entered into a database. This means twice the detection work. The much greater documentation speed of the method according to the invention theoretically possible parallel to the work flow of the operator is often inhibited in practice by precisely these slow response times of the databases. In accordance with a further advantageous embodiment of the invention, before step a), a partial quantity of the data in the database can therefore be buffered in a main memory on a workstation (what is known as a "memory database"), in step b) this data may be amended to detect the detected processes and/or services carried out, and then in step c) it can be synchronised with the database on the server or with the data sets stored there. The partial quantity of the data in the database may be referred to as a partial database or temporary database. The workstation can be operated directly by the operator and may be located or placed in, close to, or on the changing station. The partial quantity of data that is stored on the workstation can be determined on the basis of different criteria: for example one criterion may be an operated locality, that is to say may define any of the data sets of which the respective objects are located in racks in a specialist department, discipline or the like of an animal breeding station. Another criterion may be previously defined access rights for operators, for example for animal keepers, who are only authorised to carry out previously determined processes and to provide previously determined services. Due to the smaller scope of the partial database, their files can be organised and processed much more quickly from the memory of the workstation instead of being read from the server database. In addition, visual elements of a program can thus be displayed more quickly, for example the status of a rack system, an outline view or test results. The partial database can be aligned with the database stored in the server in a parallel process, chronologically after, or in an event-oriented manner.

The data sets stored to detect the processes carried out and/or services provided are updated in a process-parallel manner. For example, the stored data can be updated immediately after detection of new contents of a container so as to provide an operator or another interested party, for example the researchers responsible for a specialist discipline, with up-to-date data in real time. This also allows immediate control of all processes carried out and/or of all services to be carried out.

Identification of an object by means of a reading device is generally implemented by directing the reading device to a data carrier so as to detect the data thereof. It is usual to scan a barcode. In accordance with a further advantageous embodiment of the invention, to identify the object in step a) the respective data carrier can be placed in a working area, whereby the data of the data carrier is read out without additional input on the part of the operator. The identification consequently occurs without interruption of the natural work flow. The working area of an animal breeding station is generally the transfer table of a changing station. To this end, the reading device can be placed in such a way that its reading area is directed to, or acts over, the transfer table. A reading area of the reading device is preferably marked in the working area so as to allow reliable identification of the objects. At least one additional hand movement by the operator is therefore no longer required, namely the alignment of the reading device with the data carrier and the laying aside of the reading device. A constellation for selecting the processes to be carried out and/or services to be provided is therefore preferably called up, that is to say a search request is implemented by calling up stored data sets as soon as one or more containers or their data carriers are located in the working area and are therefore to be considered as opened.

A constellation is established, in which the position of one or more containers is determined. The positions are divided into different levels. The lowest level concerns the object itself or the positions of its container, for example in a rack, whereas the upper levels concern the classification of the specialist disciplines, for example departments, work groups or laboratories that are allocated to, or use, these positions. In addition, the properties of the contents of the container, for example the sex of the objects, can be attributes of a queried or searched constellation. Constant refining of the constellation by incoming containers and/or objects and/or further attributes may occur. As soon as one or more possible constellations have been found, a selection of processes and/or services caused by the constellation is offered to the user in a depth corresponding to the constellation. The offer of functions can be displayed, for example, by push-buttons on a toolbar.

During operation of a changing station, a plurality of objects may be located in the working area at the same time. Activation of the objects can be displayed by the computer system by bringing the data carrier into the reading area of the reading device. If the objects are stored in the initially closed containers for example, their actual activation consists in opening the containers. The physical processing of the objects and the detection of the processing as a result of a process carried out or a service provided can then be implemented. The conclusion of the processing operation, for example the closure of the containers, is signalled to the computer system by again detecting the respective data carrier by means of the reading device. The data carrier is then associated with the object, for example by applying it to the container. With the correct association of the data carriers with the respective object, that is to say for example of a cage card holder to the correct cage, a source of error still remains, which might only be discovered at a later point. In accordance with an advantageous embodiment of the method according to the invention, in addition to the detection of the object in step a), the position thereof on the work surface may be detected and, once the a process carried out or a service provided and/or the data obtained therefrom has been detected in step b), in a further step d) a plausibility check may be carried out. In this case it is checked whether each data carrier is associated with the correct object or container. An incorrect association between data carrier and object, which is difficult to discover and to correct, can thus be detected and corrected in good time. Step c) of data synchronisation may be arranged after, so as not to transfer any erroneous associations or correction thereof into the database.

The detected data are generally not initially input into a database, but are usually documented on paper for quick and direct access. In accordance with an advantageous embodiment of the invention, once a process or a service and/or the data obtained therefrom has been detected in step b), in a further step e) the process or the service and/or the data is documented by machine. The documentation may take place by creating or printing out a protocol or a label or by storage on a separate data memory or carrier. The label is associated with the respective container and can be fixed thereto, for example by means of a cage card holder as a fixing device, as is known per se. The label or the cage card inserted therein can be read conventionally and therefore constitutes a conventionally detectable data carrier carrying the data of the object in the container. A printed-out protocol accordingly reports the detected data of an object or a number of objects. The separate data memory may be a magnetic memory or chip, which, similarly to the label, can be attached to the object or its container. For example, it may likewise be attached to the cage card holder or combined therewith or with the label. In any case, it allows direct access to the documented data, without having to start a database enquiry. A considerable advantage of the method according to the invention thus also lies in the high speed with which the processes and services in the changing station can be documented.

All suitable storage media, which in any case can also be readout by machine, can be used as data carriers for the data of the objects. The data carriers can be connected fixedly or releasably to the containers. If the data carriers are connected fixedly to the containers, the container has to be detected by the reading device together with the data carrier. By contrast, releasable data carriers can be read out alone, that is to say independently of the container.

The fitting of a label into an incorrect cage card holder therefore cannot be avoided. A solution to this will be described below.

The problem stated at the outset is also solved by a computer program product that sets up a computer system with regard to programming for carrying out the above-described method, said computer system comprising a computer, an operating terminal, a printer and interfaces to a reading device. The program product consequently enables the method to be carried out in a computer-assisted manner to track processes and/or services, which concern the at least one object, wherein a reading device detects a data carrier associated with the object and containing data that describe the object and/or the properties thereof, said method comprising the following steps:
a) identifying the at least one object by detecting the data of the data carrier by means of the reading device,
b) detecting a process or a service and/or the data obtained therefrom concerning the at least one object or properties thereof, wherein, between the identification of the at least one object in step a) and the detection of a process or a service and/or the respective data in step b), in a first intermediate step ai) a selection or a partial quantity of processes and/or services from a plurality, namely from a total quantity of processes and/or services, is made according to the data detected in step a), and in a second intermediate step aii) only the selection of processes and/or services is offered to an operator to be carried out in step b).

Detection of the object in a working area, a plausibility check of the association of the data carrier with the respective object, and buffering of a partial quantity of the data contained in the database in a main memory and synchronisation with the database may also be implemented as further steps.

As already mentioned, it may not be the object, but instead only the container thereof that is labelled and detected in place of the object. In an advantageous embodiment of the invention, at least the data or attributes of a locality, or exclusively these data and attributed, may also be considered and/or detected. This may occur for the locality either in a manner representative of the object or in a manner detached from the object. A "locality" is understood to be a container of an object, but also any "container of the container", that is to say a rack, a laminar flow station or an isolator having a large number of racks and containers including objects. In the case of a container, data or attributes of a locality may accordingly concern the aspect of whether or not it is occupied by an object, whether it is cleaned or has to be cleaned, whether it is damaged, its assignment to a discipline, its location in a rack, etc. Corresponding data can also be detected for racks or isolators. Processes or services, such as a filling or emptying of a container or rack, change or assignment to another discipline, etc., can then be selected depending on the data concerning the localities. At least one isolator, rack or container management procedure can thus be set up, which for example manages the operation of one or more isolators or the filling of one or more racks. This method is particularly suitable for such applications in which, in any case, only one object per container is present in the rack. It can be expanded step by step by detecting further data in a respective database, which, in addition to the locality, also concern a rack or sub-locality for example, and/or a container, the object, or objects for example.

An input of a selection of processes and/or services to be documented at the operating terminal of the computer system can, in principle, be carried out manually by an operator. In accordance with an advantageous embodiment of the program product, an operator's voice commands can be processed to select processes to be documented and/or services to be carried out. Voice control means a further simplification of the operation process, because an operator's hands remain free. Operation can be further simplified by voice control since a selection is possible from a menu presented on a graphical user interface, for example as a result of simple acoustic numerical data in the form of a command, as is the case in voice-controlled selection menus of computerised telephone hotlines.

Alternatively or in addition, an operator's input to select processes to be documented and/or services to be carried out may be made by command cards readable by the reading device. A command card is the equivalent of a push-button on a toolbar that is displayed in a graphical user interface, or the input of a command via a keyboard. Command cards have the advantage that they can be held in a position of the reading device. They allow an operator to input a selection without taking their eyes off the working area. There is a respective command card for the most important processes and/or services to be carried out.

In accordance with a further advantageous embodiment of the program product according to the invention, widgets may be provided to describe the object and/or the content and/or properties of the contents of containers and/or selections of processes and/or services. A widget is a component of a graphical user interface. It consists on the one hand of a visible area or a window, the mouse inputs and/or keyboard inputs, and on the other hand of an object, that is not visible, which stores the status displayed in the window and can change the visible area via specific drawing operations. Widgets are generally incorporated in a specific window system and use this to interact with the user or other widgets of the window system. Widgets save an operator from manually positioning a cursor over specific fields of a graphical user interface and thus allow data to be input more quickly. Widgets also enable efficient use of voice recognition, since widgets, due to their structure, better support the natural flow of human speech compared to a formula having many fields.

Operation can be further simplified by the combination of widgets, which are not necessarily controlled by a keyboard and mouse or a pointer (cursor) controlled thereby, but additionally or exclusively by a separate keypad. A keypad is a keyboard having a possibly highly reduced number of keys. For example, it may comprise merely a numerical keyboard. The widget may have differently assigned areas depending on the process to be carried out or service to be provided. They preferably produce a reference to the keys of the keypad, for example since the areas have an arrangement corresponding to that of the keys of the keypad. By pressing a key of the keypad, the function of the widget assigned to the corresponding area of the widget can then be called. Different processes, which require numerical inputs in particular, can thus be operated comfortably using differently designed widgets, but always the same keypad.

An alternative or additional operation of a widget can be implemented with use of a voice input and/or output. To this end, an input request can be read out to the operator, for example a selection of processes or services or the requirement of a text or number input ("text-to-speech"). The operator therefore does not need to direct his gaze to the operating terminal with the display of the widget in order to learn that an input is required. The input can then be made either at the widget by pressing keys or by voice commands. For this too, the operator can keep his gaze directed largely to the work surface, without having to turn his head in the direction of the operating terminal. Since the widget can therefore be operated largely or exclusively acoustically, confirmation of a selection adopted by the program can also be provided by a voiced confirmation or a "voice prompt".

The problem described at the outset is also solved by the changing station described hereinafter for carrying out and tracking processes and/or services, which concern at least one object or a container for this object. The changing station can be open or closed. It comprises at least:
a working area for carrying out the processes to be carried out and/or services to be provided, a computer system comprising a computer for processing detected data and for outputting a selection of processes to be carried out and services to be provided, and an input interface for selecting processes to be carried out and/or services to be provided, at least one reading device for detecting data that are stored on data carriers, with a link to the computer system, data carriers, which cooperate with the reading device and can be associated with the objects or their containers.

In accordance with the invention, the reading device can be attached to the changing station in such a way that it acts over the working area. The reading device may be attached in a largely stationary manner so that it is attached fixedly in the selected position during operation of the changing station, although it can be positioned variably on the workstation, more specifically by means of displacement on a rail. Its position on the changing station is basically selected such that its reading area lies at least in part in the working area. The reading area is the space within which the reading device can successfully read out data of the data carrier.

So as to be able to process a plurality of objects, the changing station preferably has a plurality of reading devices installed in a stationary manner. These simplify the processing of the objects because they can not only be identified, but can also be detected in accordance with their position within the working area. The processes carried out and/or services provided can thus be tracked more reliably. In accordance with an advantageous embodiment of the invention, at least one reading device has a range that is limited over a sub-area of the working area. Its reading area, which is defined by the range of the reading device, preferably does not cover the entire working area. With a plurality of reading devices, each reading device preferably detects an individual sub-area, wherein the sub-areas of the reading devices do not overlap. Undesirable double detections of a data carrier by a plurality of reading devices can thus be avoided. By placing a data carrier within the reading area, an operator can thus specify that it now wants to carry out processes and/or services concerning this data carrier. The reading areas are therefore preferably labelled in the working area.

The working area is generally formed with a table or a planar table-like surface, on which the processes can be carried out and services can be provided. The reading device may preferably be fastened on the underside of the table surface, because activities taking place on the upper side therefore will not be affected. It detects the data to be read through the table surface.

All suitable storage media, which in any case can also be readout by machine, can be used as data carriers for the data concerning the objects. This also includes machine-readable labels, which can carry identification data at least. The data carriers can be connected to their container inseparably, that is to say in a manner in which they can only be removed by destroying the container and/or the data carrier. Data carrier holders fastened removably to the containers, in particular cage card holders for removable fastening of data carriers, may preferably also be arranged on the containers. For example, chip cards can be used as data carriers. This allows merely the data carrier to be brought into the reading area of the reading device, rather than the container with the data carrier. Handling is thus simplified. In addition, a data carrier can be replaced without difficulty, for example in the case of faulty functioning.

The data carrier may contain a data set, which describes the respective object. Alternatively, the data carrier may only store identification data that correlates with a data set in the database. In a preferred embodiment, a unidirectional data transfer of the identification data to the reading device may therefore take place. This makes it possible to design data carriers for the identification data in a particularly simple manner, because it does not need to have an overwritable memory to which data have to be transferred in the opposite direction from the reading device to the data carrier. Furthermore, the identification data, for example a transponder ID, thus remain unchanged, and therefore only the stored data sets in the computer system have to be updated.

All suitable wireless transfer methods can be used to transfer data between the data carrier and the reading device, for example optical data transfer by means of barcode labels or similar optical codings. The data can preferably be transferred by RFID transponders. As a result of wireless data transfer, the localised production of an electrical contact is no longer necessary. In contrast to active transponders, passive transponders also have the advantage that they do not require a voltage source because they obtain their energy from the field of the reading device.

The RFID reading device reads out the data stored on the data carrier, which is attached to a container for example. The reading range of the RFID reading device determines a reading area for the data carrier within the working area. The RFID reading device is connected to the computer system so that the detected data are transferred to the computer system. Identification data are assigned by the computer system to a stored data set. The data set contains information regarding the properties of the object and/or the position of its container. When the detected identification data and/or the stored data of an object are consulted, the computer system makes a selection from a plurality of possible processes that could be carried out in principle and/or services that could be provided in principle. The selection is displayed on a monitor of the computer system, for example on a graphical user interface. An operator can select one of the displayed, possible inputs by means of an input interface.

The input interface between the computer system of the changing station and an operator may be a keyboard, a mouse or a graphical user interface, for example a touchscreen. In accordance with an advantageous embodiment of the invention, the input interface may be designed alternatively or in addition for operation by means of command cards, which are read out by means of the reading devices. Operation of the computer of the changing station is thus facilitated, because fewer, or no, keyboard or screen inputs have to be made.

A special situation arises for isolators. These are used for the holding of laboratory animals where there are specific requirements on the sterility of laboratory animals. Since, in the case of an isolator, both the rack and the work surface are located beneath a canvas, in which defined ambient conditions prevail, food, water, medication, etc. are introduced into the canvas from outside via a lock. Animal and cage transactions on the work surface are carried out externally via glove ports. These hinder operation of input interfaces, for example because at least one hand has to be removed from a glove port for keyboard inputs. In accordance with a further advantageous embodiment of the invention, a separate, possibly mobile, keyboard or what is known as a "keypad" may belong to the changing station and can also be actuated by used glove ports. To this end, the keypad has suitably large buttons, so that it can also be operated reliably with worn gloves or used glove ports without accidental activation of adjacent buttons. An involved and time-consuming removal of an operator's hand from the glove port can thus be omitted. The keypad can be located within the canvas, from where it forwards the input data to the computer system, either by cable connection or wirelessly. It has to be sterilised before being introduced into the isolator, however, which is laborious. In accordance with a further advantageous embodiment of the invention, the keypad can therefore indeed be operated with the aid of the glove ports, but may itself be placed outside the isolator. To this end, the isolator may have a flexible, transparent canvas area, at least in a sub-area of its canvas, which forms a sealed boundary between the sterile interior of the isolator and its surrounding environment, behind which the keypad is placed and via which it can be operated from outside the isolator. The keypad may therefore remain outside the isolator, but can still be operated with worn gloves.

The keypad preferably comprises a reduced number of keys compared to a conventional computer keyboard, for example just numerical keys and few additional function keys, and can therefore be smaller in terms of its dimensions and more easily handled. So as to still allow versatile input possibilities, the keypad may use a widget for operation. The widget may have differently assigned areas in an arrangement corresponding to the keypad depending on the process to be carried out or service to be provided. By pressing a key of the keypad, the function of the widget assigned to the corresponding area of the widget can then be called. For example, the keypad may have a known, numerical key area comparable to that of a keypad telephone having 12 keys, wherein the number "1" is arranged in the top left-hand corner and a hash key "#" is arranged in the bottom right-hand corner. In a first case to input a number, the widget may display the known number keyboard, which can be actuated by pressing the hash key "#" on the widget or keypad. With another process in a second case, the widget may offer three activities at the points of the numbers "1" to "3", a confirmation at the point of the star button "*" and a termination of the process at the point of the hash key "#". Depending on the selection of a proposed activity by pressing one of the keys "1", "2" or "3" on the keypad, the selection can be confirmed by pressing the hash key "#" and the corresponding activity can be carried out and documented.

In accordance with a further advantageous embodiment of the invention, at least one glove port may be transparent, at least in part, and the keypad may be arranged on an operator's forearm via positioning means. The glove port also constitutes a flexible canvas area, which, if transparent, may serve as an operating area of the keypad located outside the isolator. The glove ports form components of the isolator, which are flexible in any case and have to be replaced occasionally. Since they are therefore generally installed so as to be exchangeable, glove ports according to the invention that are transparent at least over part, or over areas, can also be retrofitted in existing isolators. The keypad, which may be strapped to an operator's forearm, is located within a glove port during operation, and the glove is therefore drawn over the keypad. The keypad is therefore still located outside the sterile area of the isolator. It can be seen, however, through the transparent glove port and can be operated by a hand located in the other glove port. The same keypad, strapped to an operators forearm, can also be used for operation of a number of isolators in succession, without having to be changed over. The arrangement of a respective keypad for each isolator is therefore superfluous.

If processes are performed on the objects of a constellation or services are provided thereto, the data concerning the objects are generally to be updated and, in any case, the data and possibly also the processes carried out and services provided are to be documented. The changing station may therefore have an output interface for outputting documentation data sets for documentation of the detected processes and/or provided services. In particular, this allows an operator to control the operations performed. Documentation data sets contain, for example, information concerning an object or properties thereof. The output interface is preferably connected to a monitor for displaying the documentation data set and/or to a printer for printing out the documentation data set in the form of a protocol and/or label. A monitor allows direct control of the operations performed, whilst a label can be attached to a container so that information concerning its contents is available directly and permanently.

Alternatively, the updated data and/or processes carried out and/or services provided can be transferred to the data carrier or to a separate data memory. In a further preferred embodiment, bi-directional transfer of the data from and to the reading device may therefore be implemented. The reading device can therefore be used as an output interface, in addition to its function as an input interface. Once a selection from an offered process and/or services to be carried out has been made, the reading device can transfer updated data to the respective data carrier by means of a transmitting device.

The data can then advantageously be output electronically by an output device of the object or its container. It is therefore possible to save on a printer, its printing operations and raw materials. Alongside the printer, there is also no need for an acoustic load. The output interfaces may preferably be designed for wireless transfer of the documentation data set, in particular for display of the documentation data set on the display device of the container. There is thus no need to produce a cable connection for data transfer. A display device of this type has an antenna or an infrared light cell for example, to receive the documentation data set that is sent by means of a radio wave transmitter to an infra red light transmitter of the computer system of the changing station.

In a preferred development, the output interface for wireless transfer may be connected, at least temporarily, to a display device of the container to transfer the documentation data set to the display device of the container. For example, this may be the case if the container is located in the working area and is therefore located sufficiently close to the reading device as a transmitter. If the container is moved out of the working area, the distance between the reading device and the display device is too large to maintain the wireless connection.

In a preferred embodiment the display device displays the content of the transferred documentation data set after separation from the output interface. The content is therefore also displayed when the container has been placed back in its position in a rack. In a preferred embodiment a display device is used that is formed as a battery-driven label with an LCD display. Battery-driven labels of this type with an LCD display are known as a component of "electronic labelling" systems (ESLs) or as "smart labels". A display device of this type may have an antenna or an infrared light cell as a receiver, which communicate with a radio wave transmitter or an infrared light transmitter. By transferring documentation data sets to a display device of this type, the display of said data sets can be changed. It is therefore unnecessary for an operator to change a label manually. Operation of the changing station is thus reduced and the number of possible error sources is reduced.

In an alternative embodiment the display device of the container comprises electronic paper. Electronic paper allows a permanent display of information, without the need for a permanent energy supply, for example with a battery as an energy source. In this case too, a label does not need to be changed manually, and the label cannot be swapped with that of another object or container. Due to the omission of electronic components, electronic paper can also be used in an isolator, because its sterilisation poses no problems. Electronic paper merely requires an energy supply to change its display. It can be produced by a direct electrical contact with the reading device or, without contact, via LF, UHF or HF transponders or via infrared transmitters.

A further advantageous embodiment of the changing station according to the invention, which comprises racks for receiving the containers in rows side by side and in columns one above the other, has an inventory trolley with antennas arranged one above the other, with one antenna per row, a computer for buffering detected data of the data carriers of the containers, and an output interface for synchronisation of the detected data with a database. The inventory trolley can be passed over the racks of the changing station at a certain distance therefrom, so as to read out the data of the data carriers of the rack via the antennas during this process. An inventory of the rack can thus be established in a simple processing step, in which current data are recorded and stored. This data can be compared with the data sets in the database of the computer system to be considered as target data. In the event of any deviations, the data sets or the container contents can be checked and corrected.

Figure 2:
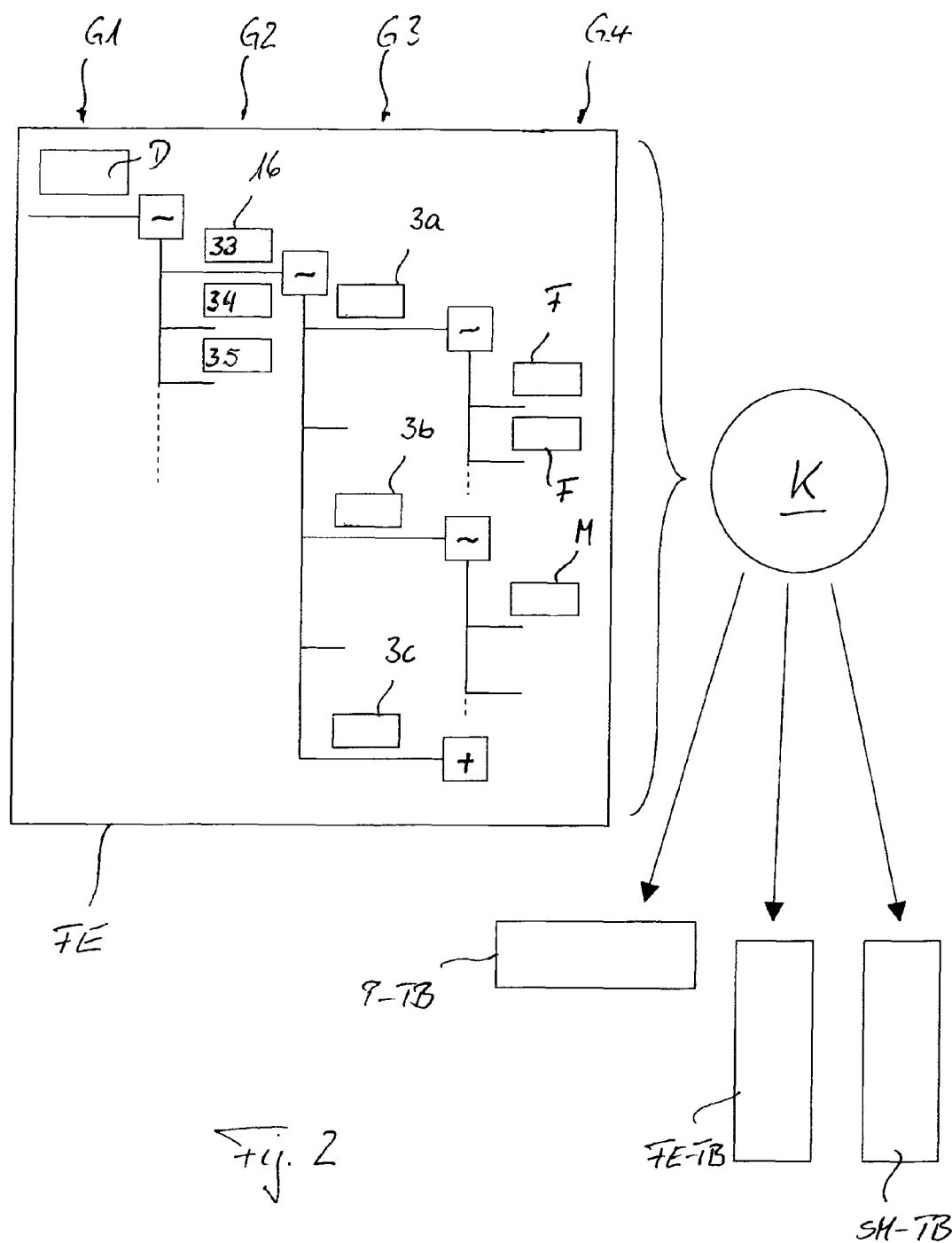
Figure 3:
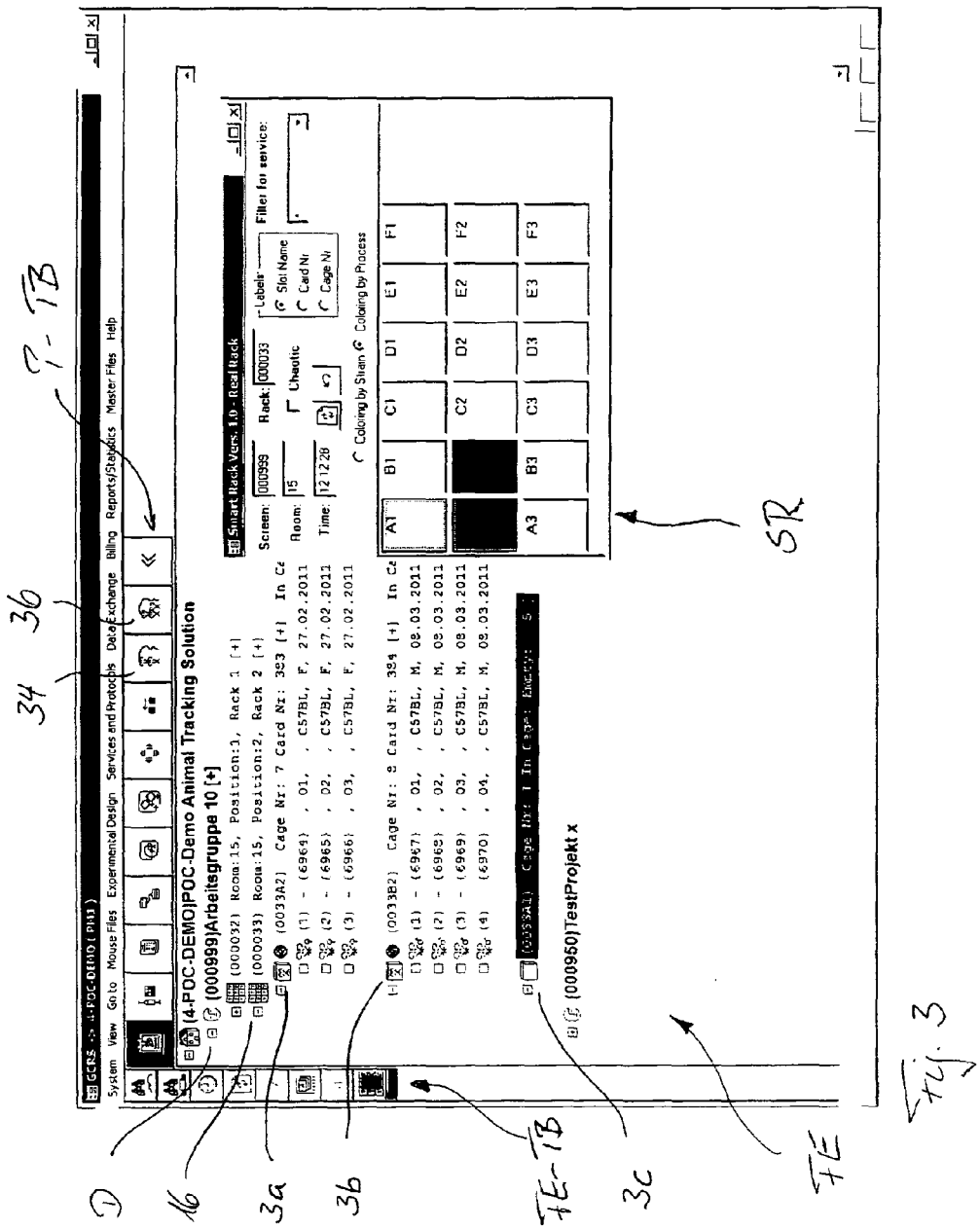
Figure 4:
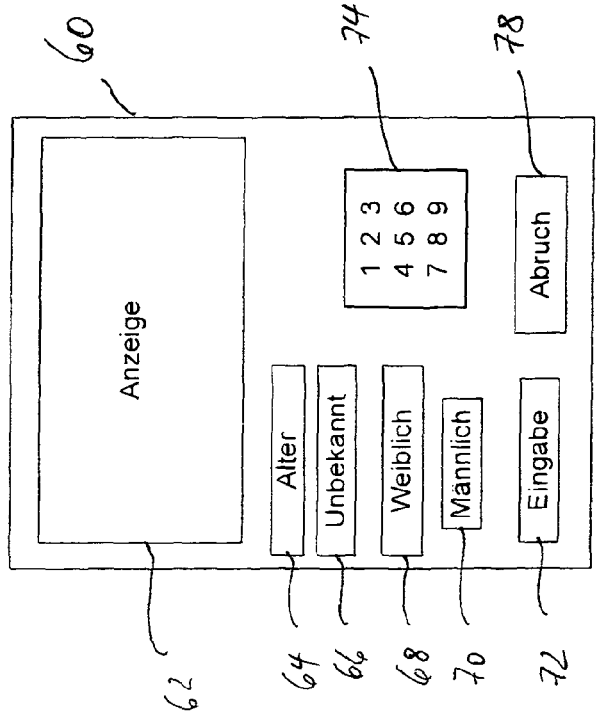
Figure 5:
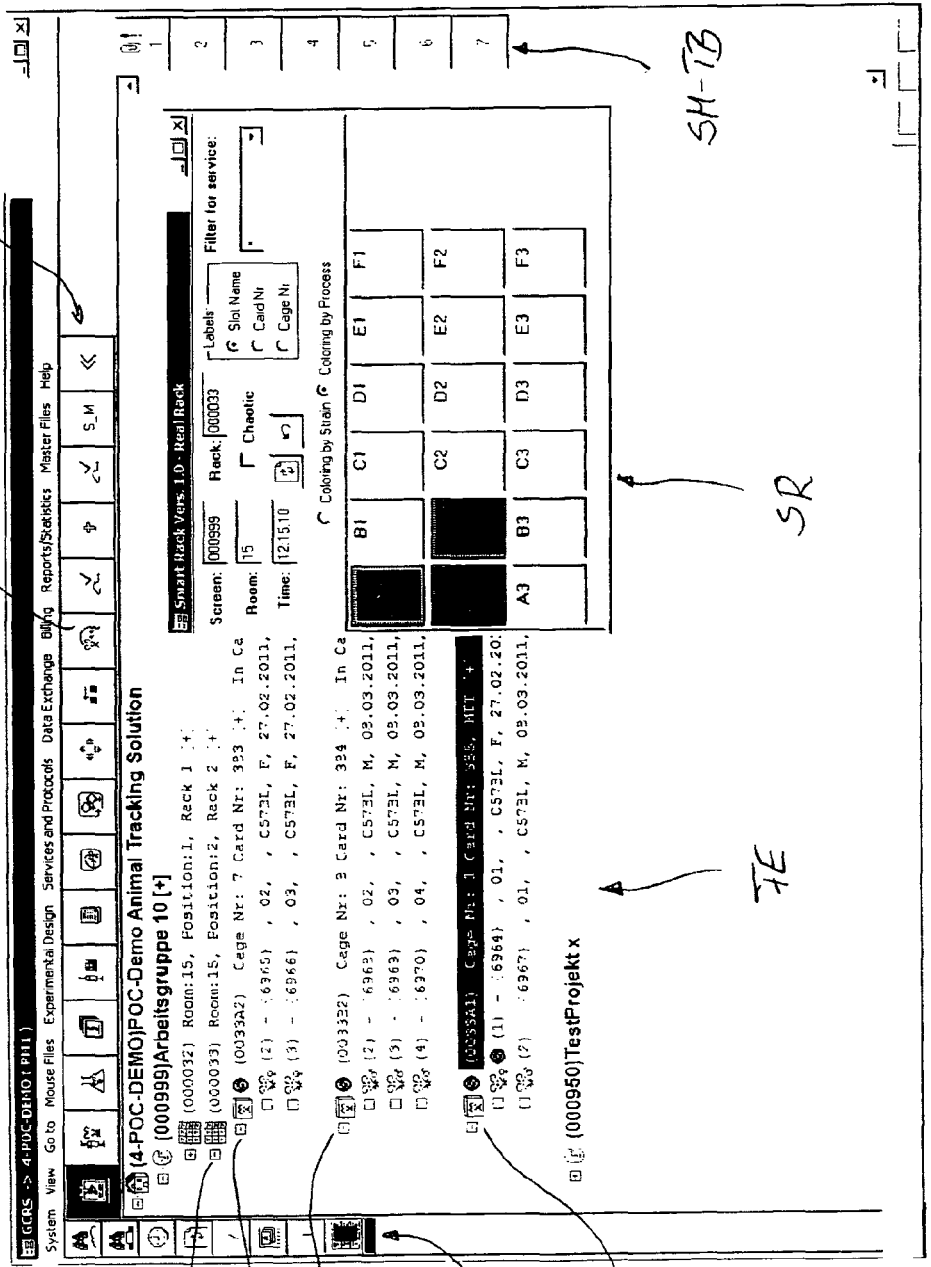
Figure 10:
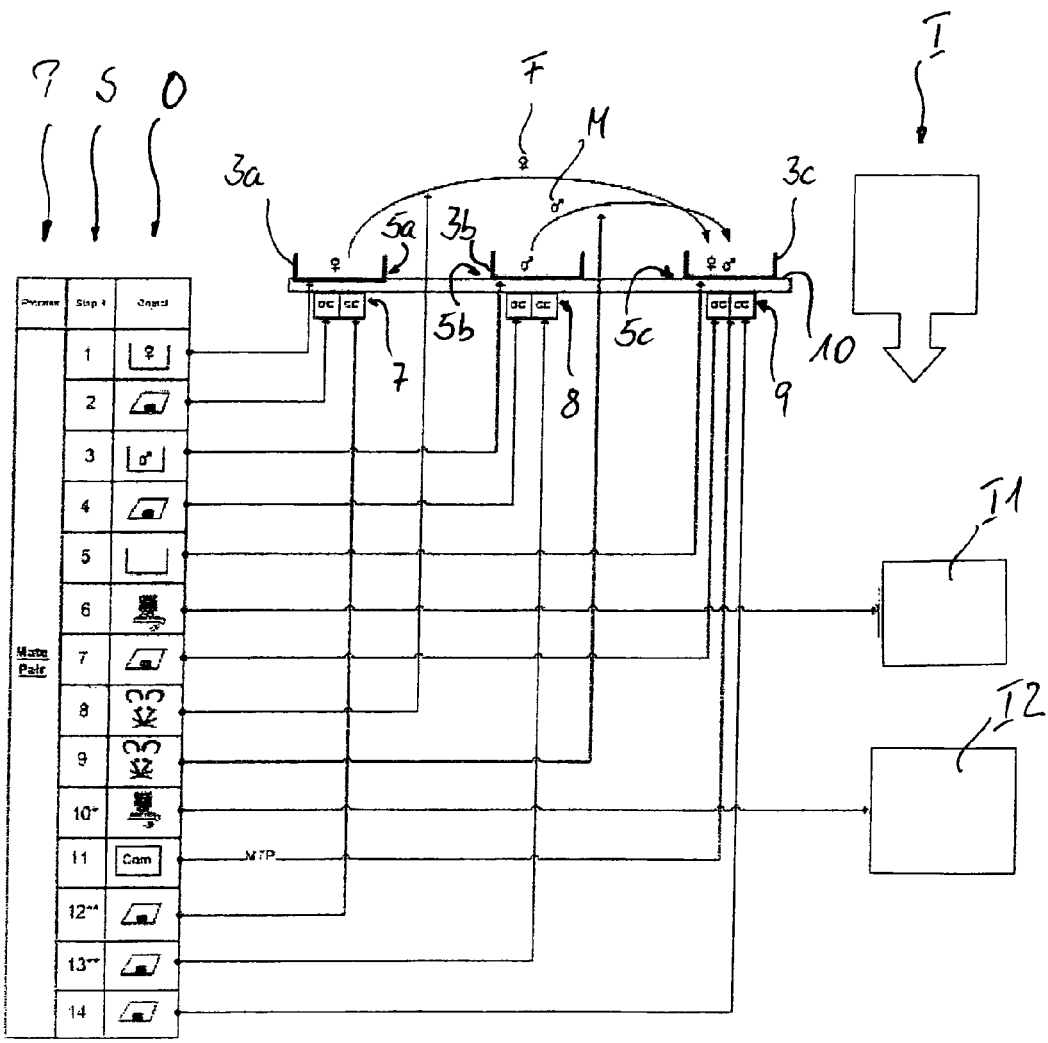
Figure 11:
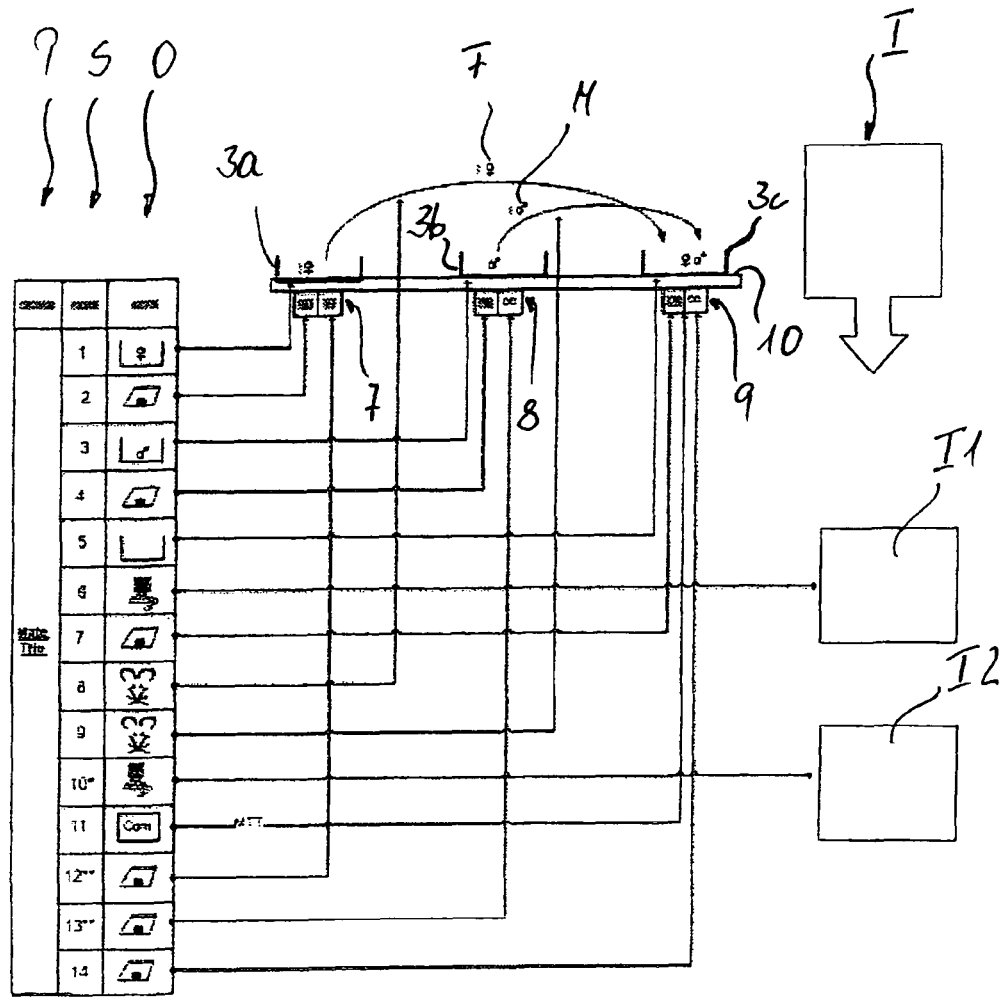
Figure 19A:
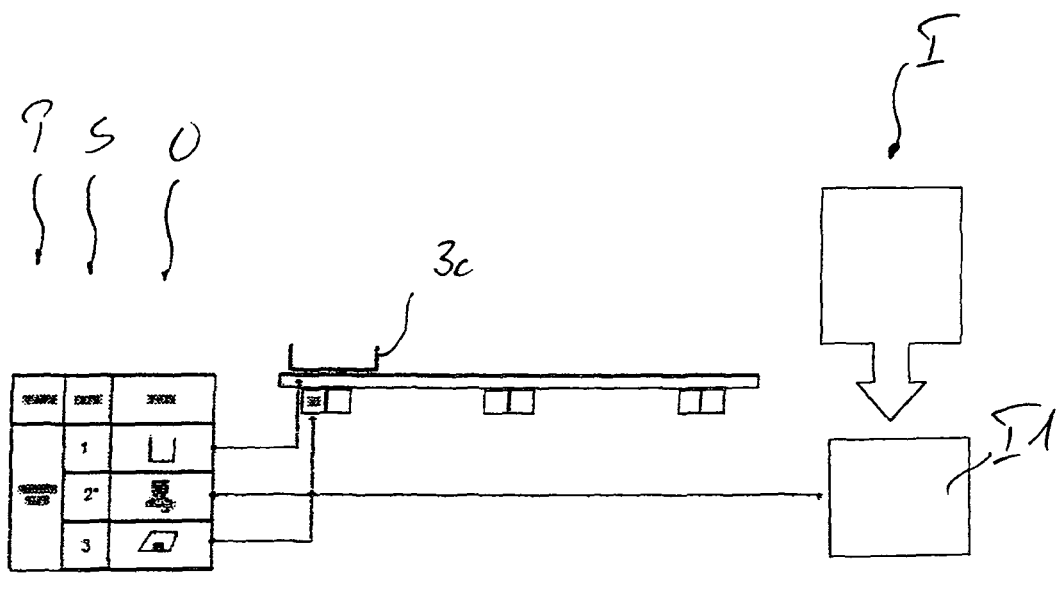
Figure 19B:
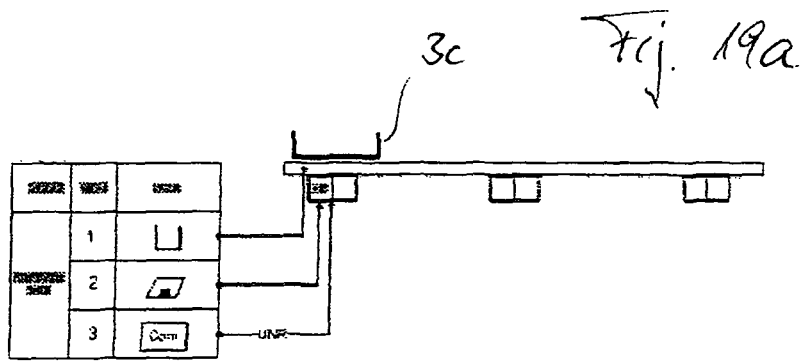
Figure 20:
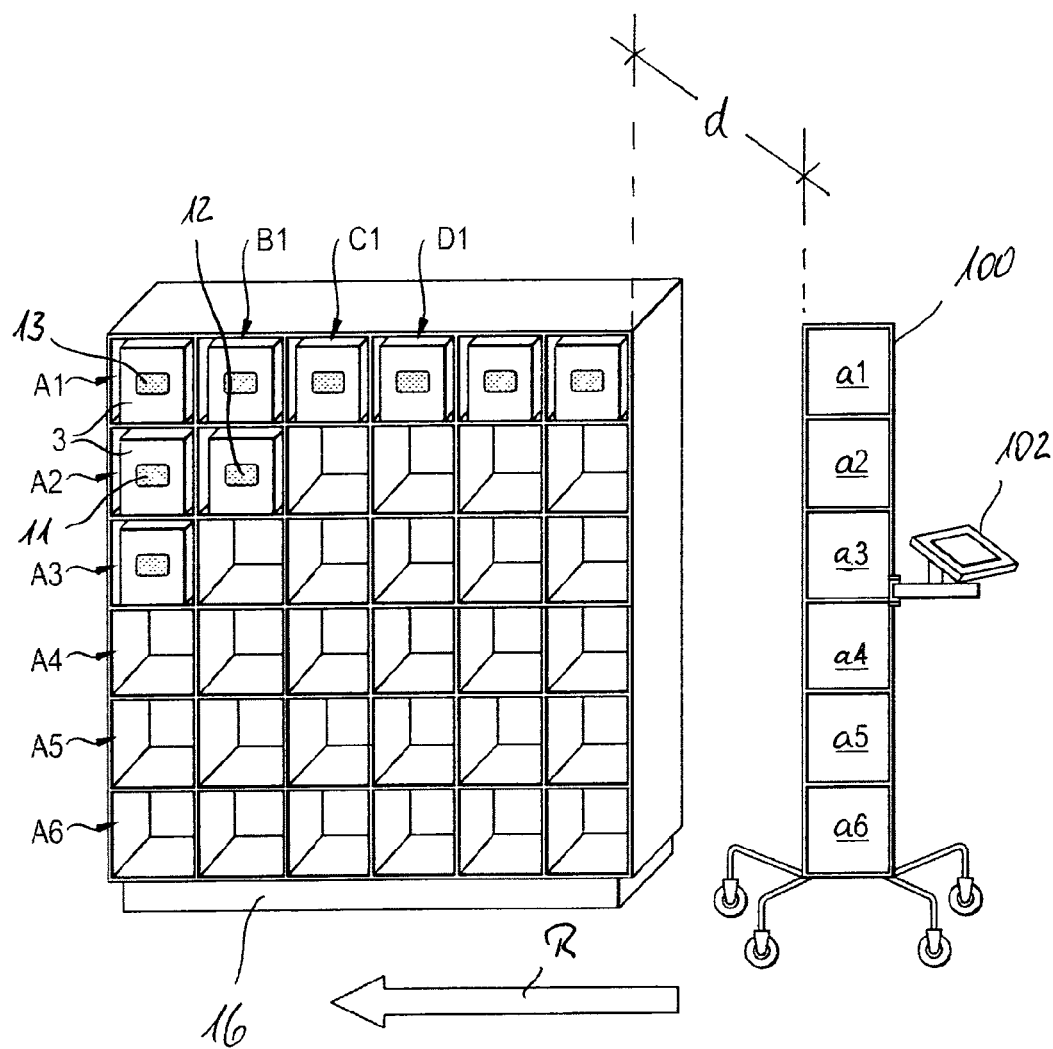
Figure 21:
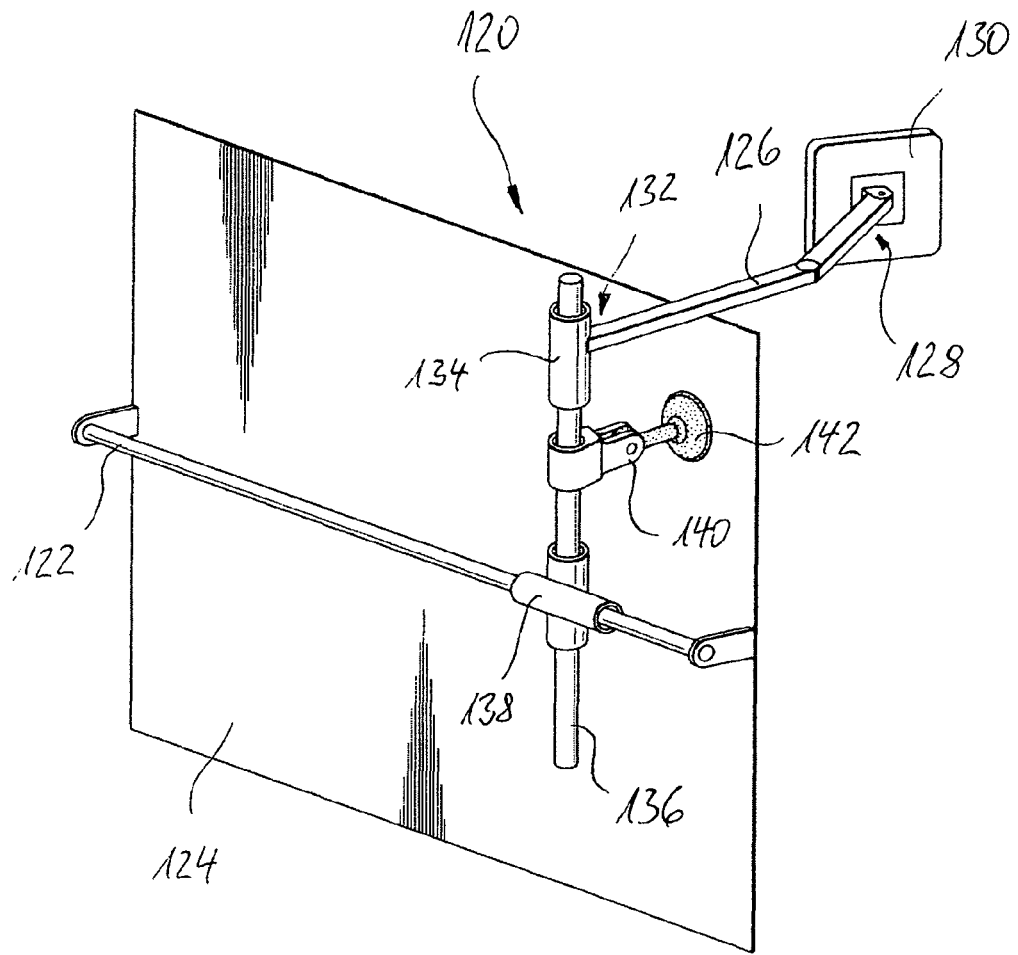

The principle of the invention will be explained hereinafter in greater detail and by way of example on the basis of drawings, in which:

FIG. 1 shows a transfer work surface, a rack, and a computer system according to the invention, FIG. 2 shows a schematic illustration of a query of a constellation, FIGS. 3 to 5 show images of screenshots of a computer system according to the invention, FIGS. 6 to 8 show examples of cage cards, FIG. 9 shows a screenshot of a completed process, FIG. 10 shows a schematic illustration of a pairing of three laboratory animals, FIG. 11 shows an illustration of a pairing of three laboratory animals, FIGS. 12 to 19 show illustrations for further transaction and transformation processes, FIG. 20 shows an inventory device FIG. 21 shows a monitor bracket.

An area of an animal facility for holding laboratory animals is illustrated schematically in FIG. 1. A rack 16, a changing station 24 and a computer system 2 are shown. The rack 16 is one of many largely similar racks and bears the number 65. Laboratory animals F, M are held in the animal facility in containers in the form of cages 3. The cages 3 are stored in compartments of the rack 16, which, in a simplified manner, comprises merely nine compartments A1 to C3 in FIG. 1.

The changing station 24 comprises a table 20, with a work surface 10. Three cages 3a, 3b, 3c are already positioned on the work surface 10 and originate from compartments A1, A2, B2 of the rack 16. Processes, namely transaction or transformation processes, can now be carried out, or services can now be provided.

A transaction process may be the removal or addition of cages 3 from or to the rack 16, the relocation of a cage 3 from a previous compartment to a new compartment within the rack 16, or the relocation of the laboratory animal F from the first cage 3a to the third cage 3c. By contrast, transformation processes concern the alteration of properties of the laboratory animals F, M, such as diseases, the birth of young, and the death of a laboratory animal F, M. Services may be tests that are carried out on the laboratory animals F, M, for example an examination of their state of health. They may also be medical procedures or new information concerning this laboratory animal O.

Data carriers 11, 12, 13, on which identification data concerning the cages 3a, 3b, 3a are stored, are attached to the cages 3a, 3b, 3c. These data carriers allow an unambiguous association of the cages 3a, 3b, 3c or the contents thereof with stored data sets in a database, which characterise the respective contents of the cages 3a, 3b, 3c. In addition, the data carriers 11, 12, 13 are associated with the compartments A1, A2, B2 in which the cages 3a, 3b, 3c are positioned (data carrier compartment association). The computer system 2 has access to the database or stores the database itself. RFID chip cards or RFID transponders are used as data carriers 11, 12, 13 and are fastened removably to the cages 3a, 3b, 3c, for example by means of card holders (not illustrated).

Three reading devices 7, 8, 9 are installed fixedly in the table 20 beneath the work surface 10 and are associated with positions 5a, 5b, 5c on the work surface 10. The positions 5a, 5b, 5c mark reading areas of the three reading devices 7, 8, 9 over the work surface 10. The reading devices 7, 8, 9 can detect the identification data of the data carriers 11, 12, 13. They have only a small range, and therefore the data carriers 11, 12, 13 only detect when the cages 3a, 3b, 3c are placed in the positions 5a, 5b, 5c and therefore within the reading area of the reading devices 7, 8, 9. Alternatively, the data carriers 11, 12, 13 can be removed from their cages 3a, 3b, 3c and can be held at the respective position 5a, 5b, 5c. The reading device 7 for example detects only the data carrier 11 of the cage 3a. The safeguard against a mix up between the cages 3a, 3b, 3c is achieved by the use of LF transponders or HF transponders as data carriers 11, 12, 13 and/or by the use of low-current reading devices, which have a reading span of up to 4 cm. By contrast, a damping antenna of the reading devices is necessary with the use of UHF transponders.

A holder 28 is attached to the table 20, in direct reach of the user, and contains four command cards 30. These likewise carry a transponder chip, in which the electronically detectable commands for processes or services are stored. There is a command card 30 for each of the most important processes and services. For example, if the laboratory animal F were transferred from cage 3a into cage 3c, which was previously empty, the user documents the process using one of the command cards 30 with the command "import animal". To this end, he selects the command card 30 that stands for the command "import animal" and that is preferably additionally inscribed therewith, and holds it in the reading area of the reading device 9. To this end, it may be necessary to release the position 5c, for example to shift the cage 3c on the table 20 backward from the position 5c, so that the reading device 9 can detect the common card 30 at the position 5c. The command cards 30 allow the user to give a command, without having to look away from the work surface 10.

The reading devices 7, 8, 9 are connected to the computer system 2. It comprises a computer 6, a printer 4 and an operating terminal 26. A computer program for carrying out the method according to the invention for tracking a process is stored on the computer 6. In addition, the data sets are also stored on said computer and concern the respective contents of the cages 3a, 3b, 3c. The operating terminal 26 is designed as a touch-sensitive screen or as a touchscreen and allows both visualisation of processes and services to be carried out by means of a graphical user interface and also inputting of commands so as to detect processes carried out or services provided. It is thus an alternative input option compared to the command cards 30. So as to be able to document the processes, services or result thereof, the computer 6 of the computer system 2 is connected to the printer 4. This is used to print out labels 14 or protocols 15. The labels 14 are fitted onto the cages 3a, 3b, 3c in the card holder. They also enable identification of one of the cages 3a, 3b, 3c or the contents thereof, but do not require any additional detection devices, since the data contained on the labels 14 can be read conventionally. The protocols 15 also detect the processes undertaken or services provided and/or the result thereof. If labels 14 cannot be used, for example in isolators for hygiene reasons, documentation in the changing station 24 occurs exclusively via the protocols 15.

In a simple form, the work surface 10 may have a cable conduit 17 with two or more reading devices 7, 8, 9 side by side. If a commercially available cable conduit with matching RFID readers (HF, LF) is used, it can be adapted cost effectively to the breadth of changing stations available on the market. These components form a reader conduit. One or more reader conduits form an input unit. One or more reader conduits are attached beneath, or in front of, the working space of the changing station for carrying out processes or services.

The reading devices 7, 8, 9 are connected within the reader or cable conduit 17 via a USB hub or via a multiplexer. Each reading device 7, 8, 9 or multiplexer is assigned a COM interface, which is permanently queried. The transponder ID of a detected transponder and the positions 5a, 5b, 5c can be transferred to the computer 6 via the interface. The positions 5a, 5b, 5c in the work surface 10 are each defined by the range of the RFID transponders and of the reading devices 7, 8, 9. The computer 6 can also write information from the database to the data carriers 11, 12, 13, depending on the transponders used on the data carriers 11, 12, 13.

The reading devices 7, 8, 9 consequently form an input unit, which recognises the transponders (RFIDs) of the data carriers 11, 12, 13 at the cages 3a, 3b, 3c and at the command cards 30 as soon as they arrive in their reading area characterised by the positions 5a, 5b, 5c. The reading devices 7, 8, 9 can therefore detect the location and the contents of the cages 3a, 3b, 3c on the work surface 10 as well as the processes carried out with their contents and services provided thereon.

In a compact embodiment the table 20 may be formed as a trolley, on which the computer 6 and the printer 4 are additionally housed. The table 20 then constitutes a mobile, open changing station.

With high hygiene requirements, the work surface 10, including the holder 28, is located within a laminar flow changing station 40. The computer 6 or its operating terminal 26 is installed outside, specifically at the user's eye level and possibly in a height-adjustable manner for ergonomic reasons.

With the highest hygiene requirements, the rack 16, the work surface 10 and possibly the holder 28 of the changing station 24 are installed in an isolator 50, which is operated by glove ports. The computer system 2 is placed outside the isolator 50, since computer technology can only be introduced into isolators in a very laborious manner and the computer system 2 can only be sterilised with difficulty within the isolator. So as to still use it, the commands of the changing station 24 equipped in accordance with the invention are input via command cards 30 within the isolator 50 or via the operating terminal 26 outside the isolator 50. Since at least one of the operator's hands has to be removed from the glove ports to provide an input at the operating terminal 26, voice recognition is provided alternatively or additionally to control the computer system 2 by means of voice commands. This allows documentation of the activities in the changing station 24, without interruption thereof.

Whilst, in the isolator 50, the data carrier compartment association in the database is determined once and the data carriers 11, 12, 13 always remain in the isolator 50, the data carrier compartment association may change with the open changing stations 24 and with the laminar flow changing stations 40, for example if a new cage card holder provided with a data carrier is attached t a cage 3 that was previously unused.

The identification data on the data carriers 11, 12, 13 of the cages 3a, 3b, 3c in positions 5a, 5b, 5c are transferred to the computer 6 of the computer system 2 via interfaces. The computer program product running on the computer 6 assigns the read-out identification data to the respective data sets from the database. The computer system 2 thus identifies the cage 3a and its contents, namely one or more laboratory animals F, in position 5a on the work surface 10, one or more laboratory animals M in cage 3b in position 5b, and the currently empty cage 3c in position 5c on the work surface 10 (FIG. 1). It therefore detects a specific constellation K (see FIG. 2). A constellation K is detected as soon as a cage 3 or its data carrier 11, 12, 13 arrives in the reading area (position 5) of a reading device 7, 8, 9 and is therefore "opened", that is to say deemed to be in process.

FIG. 2 illustrates the management of the data sets concerning the laboratory animals F, M in cages 3a, 3b in the database. They are assigned a discipline D, which has a plurality of racks 16 (FIG. 1) as localities, inter alia the rack 16 with the number 32. In the compartments A1, A2, . . . thereof (see FIG. 1), which constitute sub-localities, cages 3 can be found as sub-localities and bear individual numbers. The cage 3a in compartment A2 carries the number 7 and contains a plurality of laboratory animals F. The cage 3b is assigned to the compartment B2, carries the number 8 and contains a plurality of laboratory animals M. The cage 3c in compartment A1 carries the number 1 and is empty. This situation illustrated in FIG. 1 is detected by the computer system in the constellation K illustrated in FIG. 2. A facility explorer FE lists the constellation in hierarchical form and shows it in various classification stages G1, G2, G3, G4, arranged side by side in a perpendicular manner, on the operating terminal 26 (see FIG. 1). The discipline D is shown in classification stage G1, classification stage G2 shows the racks 16 by means of the localities 33, 34, 35, classification stage G3 illustrates the cages 3a, 3b, 3c in their compartments A1, A2, B2 of the rack 16 as sub-localities, and classification stage G4 lastly shows the contents of the cage 3a, 3b, 3c by means of the laboratory animals F, M. The facility explorer FE is a component of the computer program product.

On the basis of the detected constellation K, the computer system 2 is able to establish a selection of processes and services that is possible and sensible with the specific, detected constellation K according to FIGS. 1 and 2. It does not currently allow, for example, any processes and services that concern the detection of a litter, because only female laboratory animals F are located in cage 3a and only male laboratory animals M are contained in cage 3b. There can thus be no offspring. Instead, transfer or pairing processes or tests may be performed for example. Only these and further possible processes and services are now offered by the computer system 2 on the graphical user interface of the operating terminal 26 (FIG. 1) in the toolbar TB.

The processes and services are sorted for the sake of clarity and understanding and are shown in grouped buttons or "push-buttons", that is to say "toolbars", on the terminal 26, namely in a facility explorer toolbar FE-TB, a process toolbar P-TB and a toolbar SM-TB of a service market SM. The toolbar FE-TB offers functions for operating the facility explorer for selection, that is to say for example the calling up of a discipline D or the expanding of called-up classification stages G or localities such as the compartment A2. The computer program composes the buttons of the process toolbar P-TB depending on the selected view and the present constellation K. This is where the buttons of the processes matching the constellation K can be found. The service market SM lastly constitutes a hierarchy of services or service packets, possibly nested in one another, such as information, findings as documentations of a status of a laboratory animal F, M, enquiries therefor, etc. They may be offered by defined disciplines D or requested or enquired therefrom for a specific status of a laboratory animal F, M The operator thus obtains a reduced and therefore clearer selection of processes and services. On the one hand, these facilitate operation of the computer system 2 for the operator, because he no longer himself has to select from "right" and "wrong" processes and services. On the other hand, it reduces the likelihood of errors during operation, because accidental actuations are reduced due to the smaller selection. Lastly, the computer system 2 enables a plausibility check, should a user's inputs not be made via the toolbars TB, but via command cards, key combinations on a keyboard or voice commands.

FIG. 3 shows the components of a screenshot on the operating terminal 26: the central area adopts the hierarchical classification of the facility explorer FE. Classification stages G1, G2, G3, G4 can expand or enlarge and contract or reduce (not illustrated) in the screenshot in the facility explorer FE via the switching buttons FE-TB. New screenshots or windows may also be called up if necessary for each classification stage G (see FIG. 2). The buttons FE-TB of the facility explorer form the left edge, the buttons P-TB for the processes form the upper edge, and the buttons SM-TB (only in FIG. 5) form the right edge. The buttons FE-TB, P-TB and SM-TB can be arranged in any manner, however.

So as to offer the operator an optical reference between the hierarchical structure of the facility explorer FE on the one hand and the actual arrangement of the cages 3a, 3b, 3c in the rack 16 on the other hand, the rack 16 is also illustrated with its compartments A1, A2, etc. and the cages 3 in a smart rack SR on the right-hand side of the screenshot. The smart rack SR shows the rack 16 as a two-dimensional structure, of which the compartments A1, A2, etc. can be addressed as squares of a chessboard. The status of the compartments A1, A2, etc. is labelled as occupied, empty, activated, pair, trio, etc. with the aid of colours. A tooltip TT, that is to say a small "pop-up window" that appears suddenly, can provide further information concerning a called-up compartment.

The display of the facility explorer FE can also be controlled via the smart rack SM, for example by activating compartment A1 by means of cursor selection or direct clicking and opening it in the facility explorer FE. The representation of the smart rack can switch to an illustration of its contents, for example in accordance with strain or user groups (not illustrated).

The buttons of the toolbar TB can be selected using a cursor of the computer 6 or on a touch-sensitive screen in the form of the terminal 26 by tapping with a finger. Alternatively or in addition, inputs can be made in voice form and are processed by a voice recognition of the computer system 2. Voice inputs are the ideal medium for inputting commands in a hygiene-critical environment.

For alphanumeric inputs, for example the sex, the number of laboratory animals F, M, detection of litters or abnormalities, etc., what are known as "widgets" are used. A widget is a component of a graphical window system. The widget consists on the one hand of the window, that is to say a visible area (see FIG. 4) that receives the mouse events, keyboard events or touchscreen events, and on the other hand of a non-visible software object, which stores the status of a component and can change the visible region by specific drawing operations. FIG. 4 shows a widget 60, which is displayed when laboratory animals F, M are imported into an empty cage. It is formed of eight areas 62 to 78. It comprises a display 62, over which a performed input is shown so as to be checked. Necessary inputs in the case of import of laboratory animals F, M are the age thereof, which can be input by selecting the key 64 and via input of the age by means of a numerical keyboard 74. If the age is unknown, the widget 60 also offers a field for this by means of the key 66. The sex is input by means of the keys 68 and 70. To enable input of a multi-digit number, the widget 60 offers an input key 72, which is pressed once an input has been completed. It shows the end of the input. The key 78 is used to correct an input or to terminate the current process.

The use of widgets saves the user from manually inputting numbers or letters in fields. It even saves the positioning of a pointer or cursor over specific fields of the graphical user interface if the widget does not automatically jump to the next input field once an input has been made in another field. It thus allows data to be input more quickly and operation steps to be reduced. Widgets consequently constitute a simplified input method, because only push-buttons are used as input media. Widgets can also be set up or programmed for a process or service in terms the composition of their buttons. They can be operated by touchscreen and enable efficient use of voice recognition as a further input possibility, since widgets, due to their technology, better support the natural flow of human speech compared to a rigid formula having many fields.

In accordance with the method according to the invention, the identification data on the data carriers 11, 12, 13 containing the localities, the rack 16 or compartments A1, A2, B2 and the contents thereof, that is to say the laboratory animals F, M, are linked in the database. If the reading devices 7, 8, 9 (see FIG. 1) recognise the identification data, the computer program opens the corresponding localities in the facility explorer FE and the software focus is placed in the selected locality.

The RFID transponder of the data carrier 13 recognised in position 5c of the reading device 9 (see FIG. 1) is automatically recorded on a locality opened previously by a user in the facility explorer FE or via the locality opened via the smart rack SM. Alternatively, depending on the configuration K, the computer system 2 searches for the next free locality in the facility explorer FE and records the RFID transponder of the data carrier 13 on the locality, in this case compartment A1. If the RFID transponder of the data carrier 13 were not already recorded, the locality "compartment A1" would be called up in the computer program product and opened.

The process of a pairing will be described hereinafter on the basis of FIGS. 3 and 5 to 9, in a manner representative for the other assisted processes of the method.

From the rack 16 with the number 33 (locality) from compartment A2 (sub-locality), an animal keeper as the user has placed cage 3a with the number 7 (sub-locality) containing three female laboratory animals F on the work surface 10 of the changing station 24 (see also FIG. 1). Next to the cage 3a, the animal keeper places cage 3b with the number 8 from compartment B2 containing four male laboratory animals M. Lastly, he places beside this an empty cage 3c with the number 1 from compartment A1.

The animal keeper opens the cages 3a, 3b and the empty cage 3c physically. He removes the cage card holders of the cages 3a, 3b, 3c equipped with the data carriers 11, 12, 13 and holds each of them shortly over the respective positions or reading areas 5a, 5b, 5c of the reading devices 7, 8, 9. He thus also opens or activates the cages 3a, 3b, 3c in the facility explorer FE and in the smart rack SR. If the data carriers 11, 12, 13 are physically connected fixedly to the cages 3a, 3b, 3c, it is suffice to place the cages 3a, 3b, 3c in the positions 5a, 5b, 5c.

The computer system 2 detects the constellation K from the opened cage 3a containing female laboratory animals F, the opened cage 3b containing male laboratory animals M and the empty cage 3c. The facility explorer FE consequently offers, inter alia, a button 34 in the toolbar P-TB for a pairing of two individual laboratory animals and a button 36 for a pairing of three individual laboratory animals.

The animal keeper now places a female laboratory animal F from the cage 3a with the number 7 and a male laboratory animal M from the cage 3b with the number 8 in the cage 3c with the number 1 (see also FIG. 1). Two female laboratory animals F thus remain in cage 3a and three male laboratory animals M thus remain in cage 3b. The cage 3c consequently contains one female laboratory animal F and one male laboratory animal M. The animal keeper then gives the voice command "pair animals" or holds the "pair" command card 30 in front of the cage 3c in position 5c or presses the button 34 for "pair" from the toolbar P-TB on the terminal 26 of the computer system 2.

The computer system 2 then starts the pairing transaction. To this end, it updates the screenshot that is shown in FIG. 5. It shows the new cage contents in the facility explorer FE, and shows the location of the cages 3a, 3b, 3c in the rack 16 in the smart rack SM and a toolbar P-TB adapted to the new constellation. Since the cage 3c in position A1 is selected, in which one female laboratory animal F and one male laboratory animal M are contained, pairing is no longer offered, and instead the detection of a litter for example is offered by means of the button 38. In addition, three new cage cards 18 for each of the changed cage contents are immediately printed out (see FIGS. 6 to 8).

To conclude the process, the animal keeper brings the data carriers 11, 12, 13 of the cages 3a, 3b, 3c into the respective positions or reading areas 5a, 5b, 5c of the reading devices 7, 8, 9. The renewed detection of the data carriers 11, 12, 13 means that the cages 3a, 3b, 3c are closed in the facility explorer FE and in the smart rack SR. The cages 3a, 3b, 3c are then also closed physically and are placed back in their compartments A1, A2 and B2 within the rack 16. FIG. 9 shows a screenshot once the cages 3a, 3b, 3c have been closed. The rack 16 with the number 33 is inactive and closed. Consequently, no processes are offered in the buttons SM-TB, or only few processes are offered in the buttons P-TB, FIG. 10 shows the previously described process of the pairing of laboratory animals F, M in the form of a process notation, that is to say in 14 steps including symbols for each step. The process "pairing" is denoted in the column P on the extreme left by "Mate Pair". The individual steps are numbered in an ascending manner in the following column S. The next column O provides a symbol for each step. The work surface 10 with the three cages 3a, 3b, 3c is illustrated in the central area of FIG. 10. The reading devices 7, 8, 9 are symbolised beneath the work surface 10. Manual inputs I1, I2 of the animal keeper are symbolised in the right-hand column I.

In step 1 the cage 3a containing the female laboratory animal F is first placed on the work surface 10 of the changing station 24. In step 2 the cage 3a is opened, since its data carrier 11 (see FIG. 1) is detected by the reading device 7 for the first time. In steps 3 and 4 the process is repeated for the second cage 3b containing the male laboratory animal M. In step 5 the empty, third cage 3c is placed on the work surface 10. Unlike the previous illustration of the process, this cage is not assigned a data carrier, and therefore the animal keeper has to make an input I1 at the computer 6 (see FIG. 1) in step 6, in which he assigns the empty cage 3c to the data carrier 13 or to the compartment A1 in the rack 16 (see FIG. 1). Alternatively, the cage 3c is opened in step 7 by means of a command card 30. In steps 8 and 9 the female laboratory animal F and the male laboratory animal M can now actually be transferred from the first and second cage 3a, 3b respectively into the third cage 3c. To this end, the animal keeper has to make an input I2 at the computer 6 in step 10, namely he must input the details concerning which individual laboratory animals have been removed from each of cages 3a and 3b. The transfer and pairing of the female laboratory animal F and of the male laboratory animal M is documented by the animal keeper in step 11 by detection of a command card 30 (see FIG. 1) by the reading device 9 beneath the cage 3c, in which the pairing is to take place. To conclude, the three cages 3a, 3b, 3c are closed in steps 12, 13, 14.

Further processes and services will be presented hereinafter by way of example in the process notation explained in FIG. 10.

FIG. 11 shows the course of the process when pairing a trio of laboratory animals F, F, M. Unlike the previous example according to FIG. 10, cage 3c ultimately contains two female laboratory animals F and one male laboratory animal M.

Figure 12:
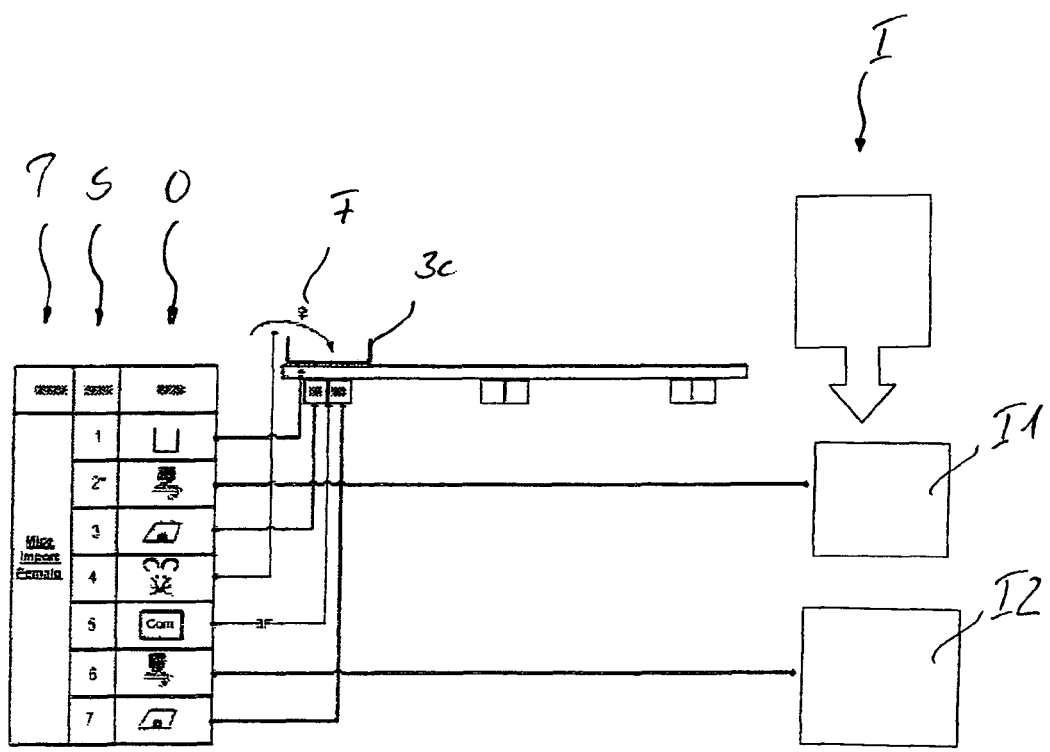

FIG. 12 shows the import of a laboratory animal F into the individual cage 3c and therefore a quasi sub-process from steps 5, 6, 7, 8, 11, 12 and 13 according to the two previous processes in FIGS. 10 and 11.

Figure 13:
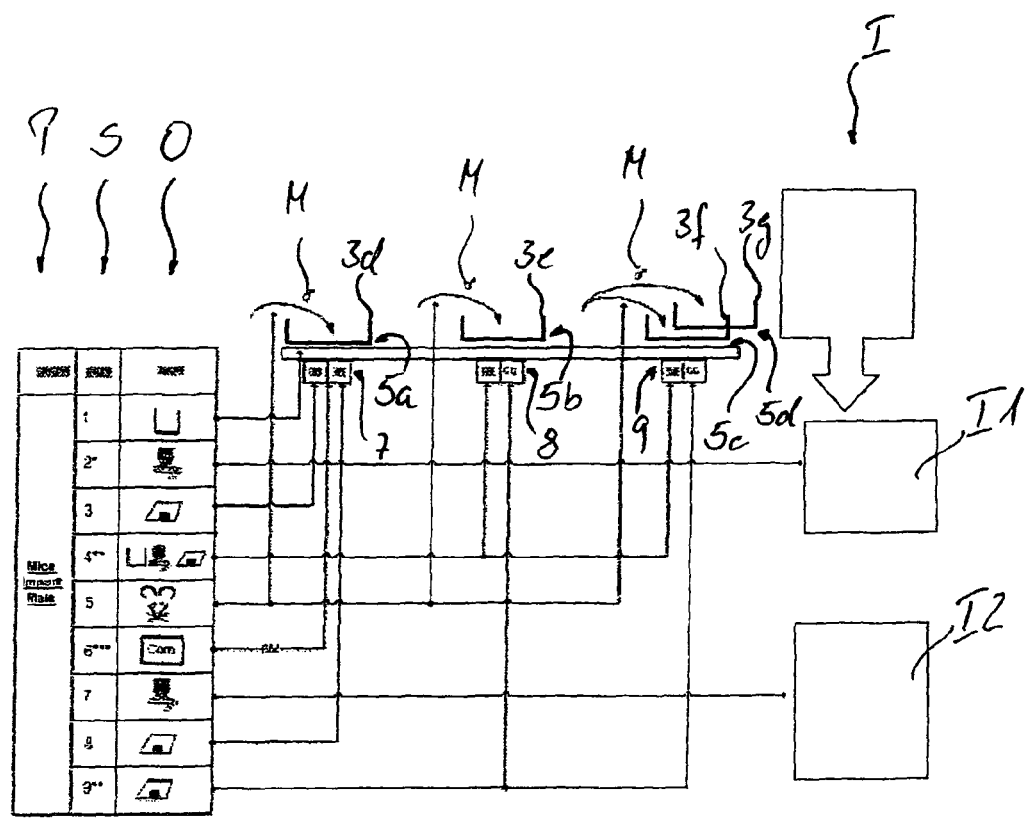

FIG. 13 shows the possibility for what are known as "mass processes", namely an import of laboratory animals M into four open cages 3d, 3e, 3f, 3g. Although the changing station 24 has three reading devices 7, 8, 9 and three positions 5a, 5b, 5c, as before, the four cages 3d, 3e, 3f, 3g are nevertheless equipped. The positions 5a, 5b are occupied conventionally by the cages 3d, 3e. An "imaginary" or virtual position 5d is arranged beside the actual position 5c with the cage 3f and is assigned to cage 3g. The position 5c of the reader 9 is explained with regard to a multi-position, in which a further, "imaginary", position 5d can be generated in the facility explorer FE and occupied by the cage 3g as soon as the position 5c itself is physically occupied. There is no physical equivalent to the imaginary position 5d, and, by contrast, the cage 3g may then be located no longer on the work surface 10 of the changing station once detected by the actual position 5c, but on an adjacent table for example (not illustrated).

Figure 14:
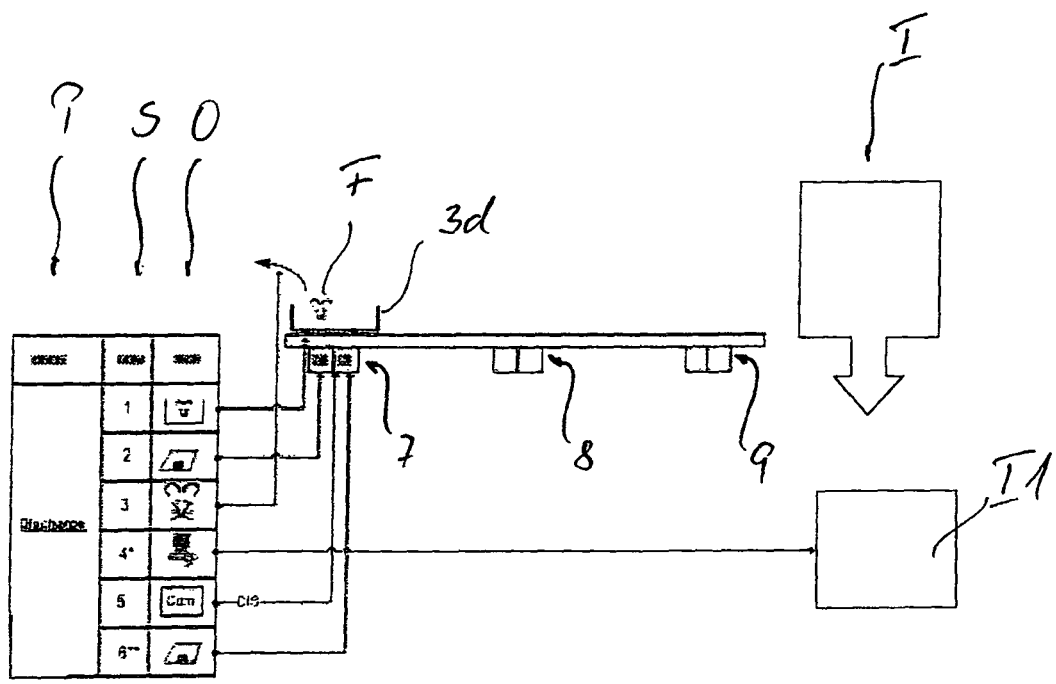

FIG. 14 shows the disposal of a dead laboratory animal F from a cage 3d. In step 1, the still occupied cage 3d is positioned over the reading device 7 and is detected or opened in step 2. Step 3 is the physical removal of the laboratory animal F from the cage 3d. In step 4 the input I1 of the animal keeper to identify the laboratory animal F is necessary if a plurality of laboratory animals F are present in cage 3d. Step 5 shows the symbol for the command card 30, with which the process is communicated to the computer 6 via the reader 7. Lastly, the cage 3d is closed in step 7.

Figure 15:
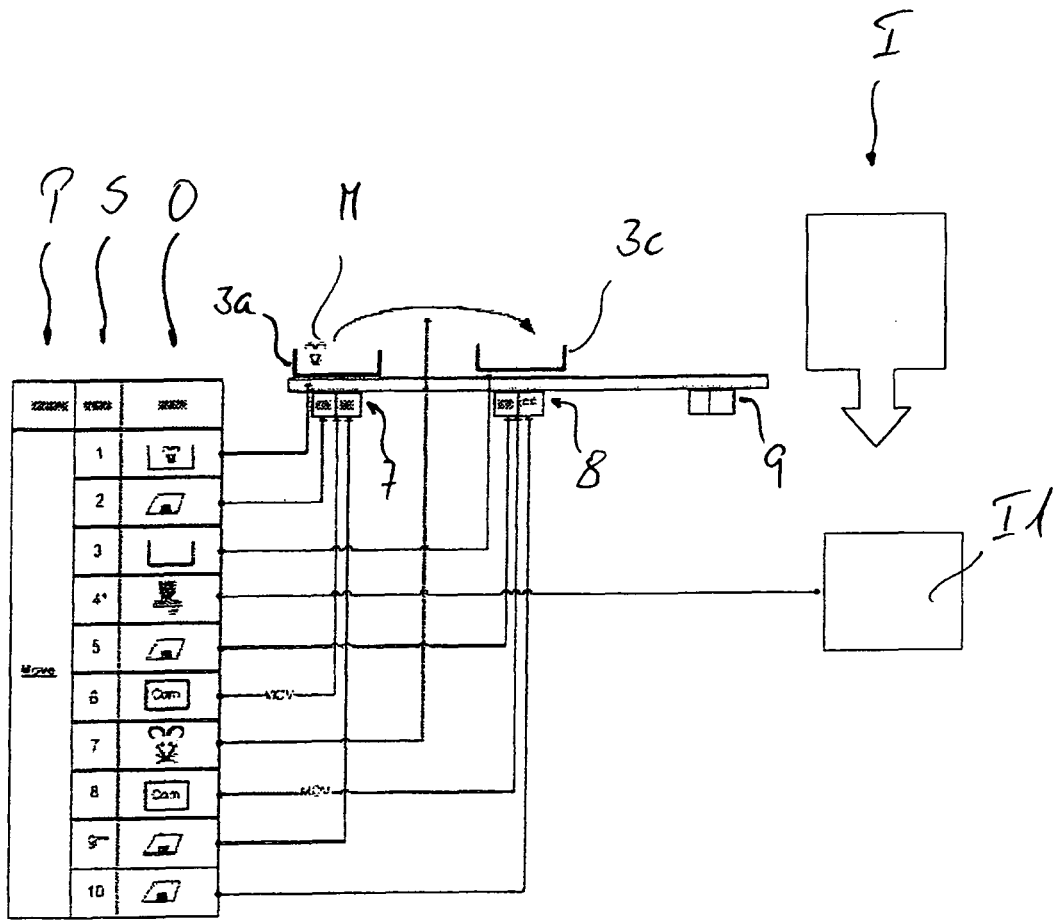

FIG. 15 shows the movement of a laboratory animal F from cage 3a into cage 3c. Once the cages 3a, 3c have been selected, recorded and opened in steps 1 to 5, the laboratory animal F is moved. The original cage 3a and the target cage 3c are communicated to the computer system 2 in steps 6 and 8 by command cards. In step 7 the laboratory animal F is physically moved between these cages. To conclude, both cages 3a, 3c are closed in steps 9 and 10.

Figure 16:
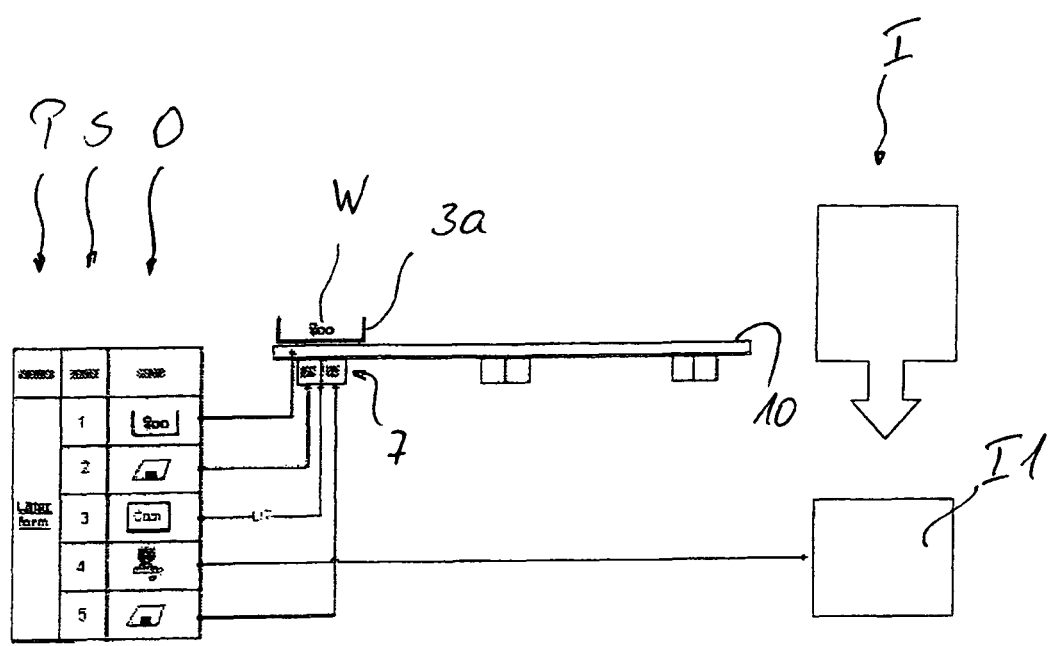

FIG. 16 shows the detection of a litter W. In steps 1 and 2 the cage 3a containing the litter W is opened in the above-described manner. In step 3 the computer 3 receives the information, via a command card 30, that a litter W has been detected in cage 3a. In step 4 a manual input I1 on the part of the animal keeper concerning the detection of the litter W is necessary, for example in accordance with number and sex. To conclude, the cage 3a is then closed again in step 5.

Figure 17:
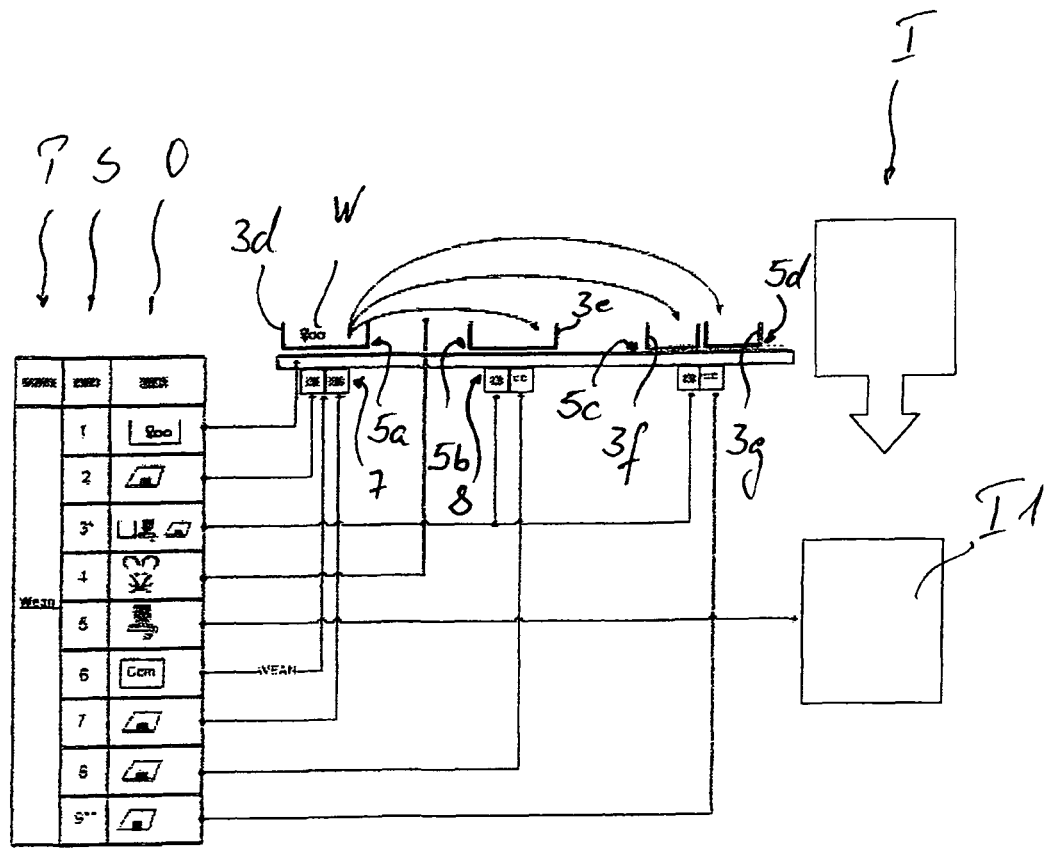

FIG. 17 shows the placement of a litter W from cage 3d into a number of cages 3e, 3f, 3g. To this end, the position 5c is again used as a multi-position (see FIG. 13), and therefore a virtual position 5d is produced for the cage 3g. For the rest, steps 1 to 9 are carried out in accordance with FIG. 16.

Figure 18:
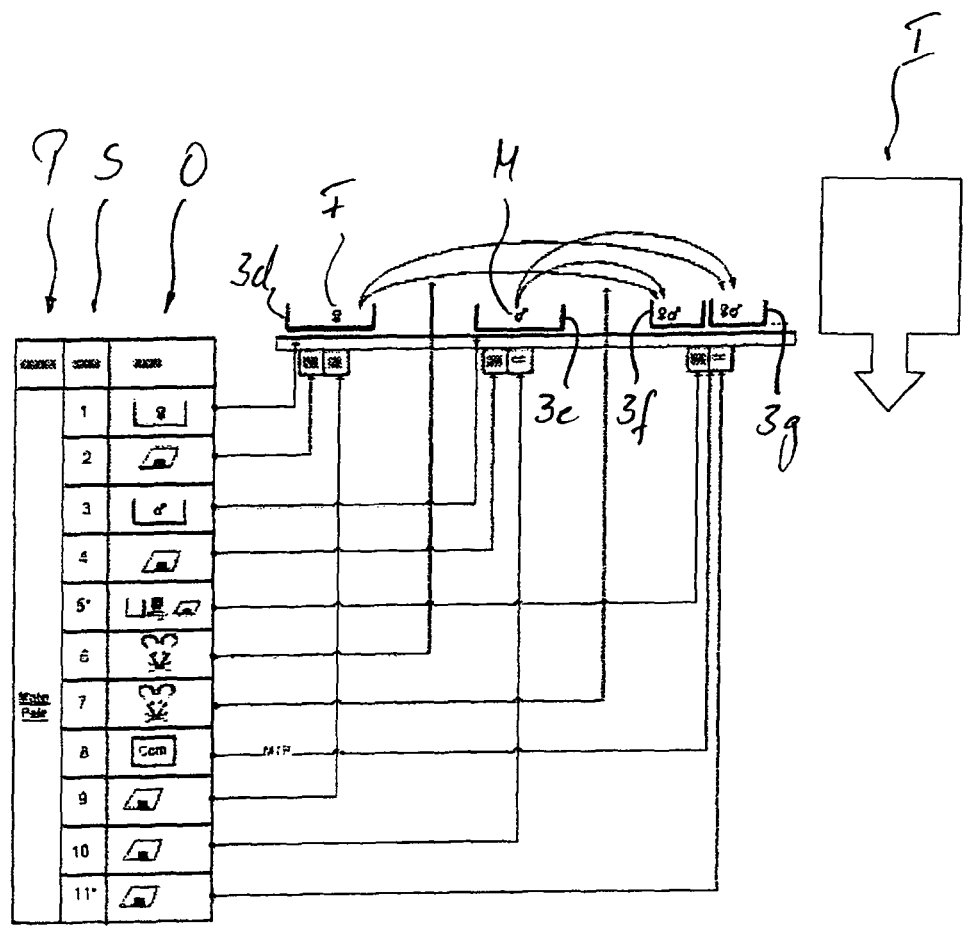

FIG. 18 shows a mass pairing in cages 3f, 3g, which is supplied from cages 3d, 3e. To this end also, the position 5c is again occupied as a multi-position with the cages 3f, 3g (see FIG. 13). By repeating step 5 (see step 4 in FIG. 13), not only can the two illustrated cages 3f, 3g be processed in position 5c, but as many cages as necessary. Step 11 has to be repeated just as often so as to close the cages 3f, 3g, etc. The mass pairing thus forms a multiplication of the pairing process according to FIG. 10. By contrast, an individual detection of the laboratory animals F, M to be paired (see step 10 in FIG. 10) is not illustrated again in FIG. 18.

FIGS. 19a and 19b show two variants of the de-registration of a cage 3c from a rack 16. The command to de-register can therefore be given by means of a keyboard input as in step two in FIG. 19a, or by means of a command card as in step 3 in FIG. 19b.

The above-described method is used to track a process. "Transactions" are tracked and processed and lead to a target stock of cages 3 and samples or laboratory animals F, M. It is therefore expedient to carry out a physical stock control (inventory) from time to time and to compare the counted, actual stock of laboratory animals F, M with the data according to the database. The physical stock-taking of the cages 3 provides a good indication of the quality of the method and of the quality of the work of the staff. The quality is expressed in an inventory difference. Since an inventory by hand is very laborious, a mobile data carrier system and transponder reader system can be used to simplify the inventory in accordance with FIG. 20.

Six antennas a1, ..., a6 are installed one above the other on a mobile trolley 100. The number of antennas a1, ..., a6 corresponds to the number of compartments A1, A2, etc., arranged one above the other, of the rack 16. The antennas a1, ..., a6 are designed to receive the data of the data carriers 11, 12, 13 on the cages 3 in the rack 16. The antennas a1, ..., a6 are coupled by a multiplexer (not illustrated) to a reader (not illustrated), which can detect the data of the data carriers 11, 12, 13. The reader is thus comparable to the readers 7, 8, 9 beneath the work surface 10 of the changing station 24. With RFID transponders as data carriers 11, 12, 13, the reader is an RFID reader. It is connected to a computer 102 on the trolley 100, which receives signals, processes received signals and buffers the data, thus obtained, of the data carriers 11, 12, 13.

To undertake an inventory of the rack 16, the trolley 100 is moved along the rack 16 in the direction R at a distance d. During this time, the antennas a1, ..., a6 receive the data of the data carriers 11, 12, 13, etc. The antennas a1, ..., a6 are dimensioned so that they receive the data of the data carriers 11, 12, 13 reliably over the distance d. The read data are the actual data of the inventory. They are buffered in the computer 102 and compared with the target data of the computer system 2 of the above-described method.

An ergonomic arrangement of the operator elements of the changing station 24 (FIG. 1) facilitates efficient execution of the above-described method considerably. Not only is the holder 28 to be attached within the user's reach, but possibly also in particular the operating terminal 26 of the computer 6. For example, this may be formed as a tablet PC or as a touchscreen monitor. The ideal operating distance between the terminal 26 and the user can be achieved via a monitor bracket 120 according to FIG. 21. This is fastened to a horizontal cross-beam 122, which is attached to an outer wall 124 of a laminar flow station or of an isolator. It is supported at an articulated arm 126, at the free end 128 of which an adapter 130 for a terminal (not illustrated) is fastened. The other end 132 of the articulated arm 126 is fastened to a clip 134, which fits in a rotatable, displaceable and clampable manner on a vertical upright pipe 136. The upright pipe 136 is fastened to the cross-beam 122 by means of a cross clip 138. The cross clip 138 can be displaced horizontally on the cross-beam and can be fixed in any desired position. The upright pipe 136 is vertically displaceable and lockable within the cross cup 136. So as to accommodate a possible tilting movement, the upright pipe 136 is also supported at the outer wall 124 via a supporting base 140 by means of a suction cup 142.

The monitor bracket 120 allows movement of the adapter 130 and of a terminal assembled thereon in vertical, horizontal and inclined directions. The terminal can thus be pivoted from a dirty side of a changing station to a clean side of a changing station, and a plurality of terminals can be fastened to the changing station.

Since the above device described in detail, the method, the computer system and the computer program product are exemplary embodiments, they can be modified widely in the conventional manner by a person skilled in the art, without departing from the scope of the invention. In particular, the subject matter can also be used in a form other than that described herein, for example in the administrative sphere of a hospital, in plant breeding or in microbiological laboratories. Furthermore, the use of the indefinite article "a" or "an" does not rule out the fact that the features in question could also be present in a plurality.

| List of reference signs | |
| --- | --- |
| 2 | computer system |
| 3, 3a, 3b, 3c | cage |
| 4 | printer |
| 5 | position, reading area |
| 6 | computer |
| 7, 8, 9 | reading device |
| 10 | work surface |
| 11, 12, 13 | data carrier |
| 14 | label |
| 15 | protocol |
| 16 | rack |
| 17 | reader conduit, cable conduit |
| 18 | cage card |
| 20 | table |
| 24 | changing station |
| 26 | operating terminal |
| 28 | holder |
| 30 | command card |
| 34, 36, 38 | buttons |
| 40 | laminar flow |
| 50 | isolator |
| 60 | widget |
| 62 | display |
| 64 to 78 | keys |
| 100 | trolley |
| 102 | computer |
| 120 | monitor bracket |
| 122 | cross-beam |
| 124 | outer wall |
| 126 | articulated arm |
| 128 | free end |
| 130 | adapter |
| 132 | end |
| 134 | clip |

-continued

| List of reference signs | |
|---|---|
| 136 | upright pipe |
| 138 | cross clip |
| 140 | supporting base |
| 142 | suction cup |
| a1, a2, ... | antennas |
| d | distance |
| A1, A2, A3 | compartment |
| B1, B2, B3 | compartment |
| C1, C2, C3 | compartment |
| F | female laboratory animal |
| FE | facility explorer |
| FE-TB | FE toolbar |
| G, G1, G2, ... | classification stage |
| I | input column |
| I1, I2 | manual input |
| K | constellation |
| M | male laboratory animal |
| O | symbol column |
| P | process column |
| P-TB | process toolbar |
| R | direction of travel of the trolley 100 |
| S | step column |
| SM | service market |
| SM-TB | SM toolbar |
| SR | smart rack |
| TT | tool tip |
| W | litter |

The invention claimed is:

1. A method for tracking processes and/or services, which concern at least one object (F; M; 3a; 3b; 3c; 11; 12; 13) from a plurality of objects, in which a reading device (7; 8; 9) detects a data carrier (12) associated with the object (F; M; 3a; 3b; 3c; 11; 12; 13) and containing data that describe the object (F; M; 3a; 3b; 3c; 11; 12; 13) and/or properties thereof, said method comprising the following steps:

a) identifying the object (F; M; 3a; 3b; 3c; 11; 12; 13) by detecting the data of the data carrier (12) by means of the reading device 17; 8; 9), b) detecting a process or a service and/or data obtained therefrom concerning the object (F; M; 3a; 3b; 3c; 11; 12; 13) and/or properties thereof, wherein, after identification of the object (F; M; 3a; 3b; 3c; 11; 12; 13) in step a), in a subsequent step ai) a selection of processes and/or services from a plurality of processes and/or services is made automatically depending on the detected data and is offered in a step aii) to carry out in step b) and performed without need for human intervention.

2. The method according to claim 1, wherein, in step a) for identifying the object (F; M; 3a; 3b; 3c; 11; 12; 13), the respective data carrier (12) is moved into a working area (10).

3. The method according to claim 1, wherein a position of the object (F; M; 3a; 3b; 3c; 11; 12; 13) in a working area (10) is detected and, upon a selection of processes and/or services, a plausibility check of the association of the data carrier (12) with the respective object (F; M; 3a; 3b; 3c; 11; 12; 13) is carried out in step d).

4. A computer program product for setting up a computer system (2) with regard to programming, said computer system comprising a computer, comprising an operating terminal, comprising a printer (4) and comprising interfaces to the reading device (7; 8; 9), for carrying out a method according to claim 1 comprising the following steps:

a) identifying the object (F; M; 3a; 3b; 3c; 11; 12; 13) by detecting the data of the data carrier (12) by means of the reading device (7; 8; 9), b) detecting a process or a service and/or data obtained therefrom concerning the object (F; M; 3a; 3b; 3c; 11; 12; 13) and/or properties thereof, wherein, after identification of the object (F; M; 3a; 3b; 3c; 11; 12; 13) in step a), in a subsequent step ai) a selection of processes and/or services from a plurality of processes and/or services is made depending on the detected data and is offered in a step aii) to carry out in step b).

5. A computer program product according to claim 4, wherein only the data concerning a locality (3; 16) of the object (F; M; 3a; 3b; 3c; 11; 12; 13) are detected.

6. The computer program product according to claim 4, wherein an operator's acoustic voice commands are processed for the input of commands or data.

7. The computer program product according to claim 4, wherein processes and/or services are selected by command cards (30) that can be read by the reading device (7; 8; 9).

8. The computer program product according to claim 6, wherein processes and/or services are selected by command cards (30) that can be read by the reading device (7; 8; 9).

9. A changing station for carrying out the method according to claim 1 for tracking processes and/or services, which concern the at least one object (F; M; 3a; 3b; 3c; 11; 12; 13), said changing station comprising a work surface (10) for carrying out the processes and/or for providing services, the reading device (7; 8; 9) for detecting data stored on the data carrier (12) of the object (F; M; 3a; 3b; 3c; 11; 12; 13), a computer system (2) for storing data sets concerning the object (F; M; 3a; 3b; 3c; 11; 12; 13) and/or properties thereof, and an input interface for selecting processes to be carried out and/or services to be provided, wherein the reading device (7; 8; 9) acts over the work surface (10).

10. The changing station according to claim 9, wherein the reading device (7, 8, 9) has a limited range.

11. The changing station according to claim 9, comprising an output interface for outputting, by machine, documentation data sets for documentation of the detected processes and/or services provided.

12. The changing station according to claim 11, wherein the reading device (7; 8; 9) additionally comprises an output interface for wireless transfer of the documentation data set, in particular for the display of the documentation data set on a display device of a container.

13. The changing station according to claim 12, wherein the display device displays the content of the transferred documentation data set after separation from the output interface.

14. The changing station according to claim 13, comprising a battery-driven label with an LCD display or electronic paper as the display device of the container (3).

15. The changing station according to claim 9, comprising an output interface for outputting, by machine, documentation data sets for documentation of the detected processes and/or services provided.

16. The changing station according to claim 15, wherein the reading device (7; 8; 9) additionally comprising an output interface for wireless transfer of the documentation data set, in particular for the display of the documentation data set on a display device of a container.

17. The changing station according to claim 16, wherein the display device displays the content of the transferred documentation data set after separation from the output interface.

18. The changing station according to claim 17, comprising a battery-driven label with an LCD display or electronic paper as the display device of the container (3).

19. The method according to claim 1, wherein, at least one function and/or at least one service from the plurality of processes or services is quality assured by a computer program.

20. A method for tracking processes and/or services, which concern at least one object (F; M; 3*a*; 3*b*; 3*c*; 11; 12; 13) from a plurality of objects, in which a reading device (7; 8; 9) detects a data carrier (12) associated with the object (F; M; 3*a*; 3*b*; 3*c*; 11; 12; 13) and containing data that describe the object (F; M; 3*a*; 3*b*; 3*c*; 11; 12; 13) and/or properties thereof, said method comprising the following steps:

a) identifying the object (F; M; 3*a*; 3*b*; 3*c*; 11; 12; 13) by detecting the data of the data carrier (12) by means of the reading device 17; 8; 9),
b) detecting a process or a service and/or data obtained therefrom concerning the object (F; M; 3*a*; 3*b*; 3*c*; 11; 12; 13) and/or properties thereof,
wherein, after identification of the object (F; M; 3*a*; 3*b*; 3*c*; 11; 12; 13) in step a), in a subsequent step ai) a selection of processes and/or services from a plurality of processes and/or services is made depending on the detected data and is offered in a step aii) to carry out in step b), and
wherein the plurality of objects (F; M; 3*a*; 3*b*; 3*c*; 11; 12; 13) comprises a plurality of parallel called objects, wherein at least one of the plurality of parallel called objects engages in an interaction with another one of the plurality of parallel called objects, and wherein the interaction is confirmed by a user in the step b).

* * * * *